(12) United States Patent
Ikeno et al.

(10) Patent No.: US 7,755,804 B2
(45) Date of Patent: Jul. 13, 2010

(54) IMAGE READING APPARATUS

(75) Inventors: Takahiro Ikeno, Owariasahi (JP); Keiichi Nakano, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1095 days.

(21) Appl. No.: 11/380,761

(22) Filed: Apr. 28, 2006

(65) Prior Publication Data

US 2006/0245015 A1 Nov. 2, 2006

(30) Foreign Application Priority Data

Apr. 28, 2005 (JP) ............................. 2005-132299

(51) Int. Cl.
H04N 1/40 (2006.01)
(52) U.S. Cl. ................... 358/461; 358/474; 358/518
(58) Field of Classification Search ................. None
See application file for complete search history.

(56) References Cited

U.S. PATENT DOCUMENTS

| 5,317,421 | A | * | 5/1994 | Ito ............................. 358/464 |
| 5,982,948 | A | * | 11/1999 | Shimada et al. ............. 382/274 |
| 6,700,683 | B1 | * | 3/2004 | Hashizume ................ 358/461 |
| 6,704,457 | B1 | * | 3/2004 | Sugiura ...................... 382/274 |
| 6,801,670 | B2 | * | 10/2004 | Kijima et al. ............... 382/274 |

(Continued)

FOREIGN PATENT DOCUMENTS

JP H04-320159 A 11/1992

(Continued)

OTHER PUBLICATIONS

European Search Report for European Patent Appl'n. No. 06 25 2249 (counterpart to above-captioned patent application) completed Jul. 26, 2006.

(Continued)

*Primary Examiner*—Mark K Zimmerman
*Assistant Examiner*—Dung D Tran
(74) *Attorney, Agent, or Firm*—Baker Botts L.L.P.

(57) ABSTRACT

An image reading apparatus for reading an image with respect to a plurality of colors, including: a reference member; an image reading device including a plurality of light receiving elements, the image reading device reading the reference member to obtain white level information for the respective colors, the white level information for each of the colors being a set of data of a quantity obtained by the light receiving elements, the read image being corrected based on at least the white level information; a ratio calculator calculating a ratio among the information of the respective colors; an abnormal-data determiner determining that a first piece of data in the level information of any particular color is abnormal data, where the first piece of data is different from a second specific piece of data in the level information of the same color which second specific piece of data is in a predetermined relationship with the first specific data, by an amount not smaller than a threshold, or where the first specific data is outside a range; and a data corrector obtaining correction data obtained by multiplying, by the ratio, corresponding data which corresponds to the abnormal data according to a predefined principle and included in the information of at least one color determined to be not including the abnormal data, and replaces the abnormal data with the correction data.

12 Claims, 14 Drawing Sheets

U.S. PATENT DOCUMENTS

| | | | | |
|---|---|---|---|---|
| 6,920,251 | B2* | 7/2005 | Toriyama | 382/274 |
| 6,958,834 | B1* | 10/2005 | Ide | 358/505 |
| 7,236,275 | B2* | 6/2007 | Fukuzawa | 358/509 |
| 7,324,243 | B2* | 1/2008 | Cheng | 358/461 |
| 7,359,090 | B2* | 4/2008 | Cholewo et al. | 358/1.9 |
| 2002/0003908 | A1* | 1/2002 | Kijima et al. | 382/274 |
| 2004/0114827 | A1 | 6/2004 | Chizawa et al. | |
| 2004/0179242 | A1 | 9/2004 | Nakaya | |
| 2005/0083544 | A1* | 4/2005 | Kondoh | 358/1.9 |
| 2005/0134937 | A1* | 6/2005 | Cholewo et al. | 358/461 |

FOREIGN PATENT DOCUMENTS

| | | |
|---|---|---|
| JP | H6 22133 | 1/1994 |
| JP | H10 294870 | 11/1998 |
| JP | H11 168600 | 6/1999 |
| JP | 2000270159 A | 9/2000 |
| JP | 2003 32490 | 1/2003 |

OTHER PUBLICATIONS

Japan Patent Office; Notification of Reason for Refusal in Japanese Patent Application No. 2005-132299 (counterpart to the above-captioned U.S. Patent Application) mailed Mar. 2, 2010.

* cited by examiner

WIDTH OF READING BY THE CIS UNIT 40

WIDTH OF READING BY THE CIS UNIT 40

WIDTH OF READING BY THE CIS UNIT 40

WIDTH OF READING BY THE CIS UNIT 40

WIDTH OF READING BY THE CIS UNIT 40

WIDTH OF READING BY THE CIS UNIT 40

IMAGE READING APPARATUS

INCORPORATION BY REFERENCE

The present application is based on Japanese Patent Application No. 2005-132299, filed on Apr. 28, 2005, the content of which is incorporated herein by reference.

BACKGROUND OF THE INVENTION

1. Field of the Invention

The invention relates to an image reading apparatus for reading an image, including a reference member and an image reading device having a plurality of light receiving elements and reading the reference member by the light receiving elements with respect to a plurality of colors, in order to obtain white level information for the respective colors based on at least which data of the read image is corrected.

2. Description of Related Art

As an image reading apparatus incorporated in a copy machine, a scanner, or a multifunctional apparatus having functions thereof, there are known a flatbed scanner, and an apparatus in which an image reading device, e.g., a CCD (Charge Coupled Device) or a CIS (Contact Image Sensor), is disposed at a predetermined relative position with respect to a mechanism called ADF (Auto Document Feeder) that operates to automatically feed document sheets, which is a document in the form of cut sheets, from a document supply tray to a catch tray along a feed path, in order to read an image on each document sheet while the document sheet is fed.

For instance, there is known an image reading apparatus that has a cover structure or a document holding member including an ADF, a reading table having at an upper surface thereof a platen glass, an image reading device disposed in the reading table, and a document supply tray on which document sheets each with an image thereon are stacked. On the platen glass, a fed-document reading area is defined, and the ADF feeds the document sheets one by one from the document supply tray to the fed-document reading area, so that the image reading device in the reading table operates to read the image on the document sheet as passing across the fed-document reading area on the platen glass. However, the image reading apparatus can also function as a flatbed scanner, that is, a stationary-document reading area is also defined on the platen glass, and the image reading apparatus can be used in such a manner that a document with an image thereon is placed on the platen glass and the document holding member is closed to hold down and fix in position the document, and then the image reading device is operated to read the image on the document.

The CCD or CIS used as an image reading device or image sensor has light sources and light receiving elements, and reads an image on a document as follows. The light sources emit light of a plurality of colors, namely, red (R), green (G), and blue (B), toward the platen glass so that the emitted light of respective colors is transmitted through the platen glass and reflected by a surface of the document. The reflected light is received by the light receiving elements that convert the received light of the respective colors RGB into electrical signals. Since undesirable variations occur with regard to operations of the light sources and the light receiving elements of such an image reading device, namely, amounts of light of RGB emitted from the light sources and spatial distributions of the RGB light, and photographic sensitivities of the light receiving elements, a control operation called "shading correction" is implemented to correct image data obtained by reading the image on the document using the image reading device. More specifically, the shading correction is an operation such that the amount of the RGB light as emitted from the light sources is adjusted with respect to a white-colored reference member, and then the reference member is read to obtain white level information and black level information for each of RGB while the light sources emit RGB light of the amounts adjusted as described above, so that the image data read thereafter is corrected based on the thus obtained white and black level information. For instance, the conventional image reading apparatus described above has the reference member on an under side of a partitioning member that is disposed to divide an upper surface of the platen glass into two areas, namely, the fed-document reading area and a stationary-document reading area, and the apparatus is set to adjust the amount of the RGB light emitted from the light sources with respect to the reference member, and obtain reference data for each of RGB, prior to reading the image.

Where a foreign particle, a flaw, or the like is on the reference member, a quantity obtained by reading the reference member as the white level information shows a local abrupt variation resulting from the foreign particle, flaw, or the like. When data of a read image is subjected to the shading correction based on such white level information, a line extending in an auxiliary scanning direction, called shading line, occurs in the read image. JP-A-6-22133 discloses a technique to take measures to this problem, that is, to detect an abnormality in any set of data of a quantity obtained as the white level information for each of RGB, which abnormality results from the foreign particle, flaw, or the like, and to replace abnormal data in the white level information, if any, with data in another set of data of the white level information not including the abnormal data, which data is positionally corresponding to the abnormal data.

However, the white level information obtained by reading the reference member is different from color to color. That is, in the image reading device, a plurality of lenses are disposed for concentrating the RGB light, and a plurality of the light receiving elements are provided for receiving the RGB light, and the chromatic aberration of the lenses and the sensitivity characteristic of the light receiving elements differs from color to color, thereby making the white level information different from color to color. Thus, simply replacing an abnormal part of the abnormal white level information with a corresponding part of the normal white level information results in inaccuracy of the shading correction. More specifically, a local abrupt variation occurs in the read image, namely, a place in the read image that corresponds to an abnormal part of the white level information is unnaturally different from the other part of the read image. Thus, the problem of the shading line seen in the read image is not solved.

SUMMARY OF THE INVENTION

This invention has been developed in view of the above-described situations, and it is an object of the invention to provide an image reading apparatus which includes a plurality of groups of light sources, each group for emitting light of one of a plurality of colors according to a color separation technology, toward a document with an image thereon to read the image thereby, and is capable of easily and appropriately correcting white level information including an abnormality due to a foreign particle or the like present on the reference member.

To attain the above object, the invention provides an image reading apparatus for reading an image with respect to a plurality of colors, including: a reference member; an image reading device including a plurality of light receiving elements, the image reading device reading the reference member to obtain white level information for the respective colors, the white level information for each of the colors being a set of data of a quantity obtained by the light receiving elements, the read image being corrected based on at least the white level information; a ratio calculator which calculates a ratio among the white level information of the respective colors; an abnormal-data determiner which determines that a first piece of data in the white level information of any particular color is abnormal data, in each of the following two cases: (i) where the first piece of data is different from a second specific piece of data in the white level information of the same color which second specific piece of data is in a predetermined relationship with the first specific data, by an amount not smaller than a predetermined threshold; and (ii) where the first specific data is outside a predetermined range; and a data corrector which obtains correction data which is obtained by multiplying, by the ratio, corresponding data which corresponds to the abnormal data according to a predefined principle and included in the white level information of at least one color which is determined to be not including the abnormal data, and replaces the abnormal data with the correction data.

According to this apparatus, it is determined whether the white level information for each of the colors includes an abnormality, in other words, it is determined whether each of sets of data of a quantity obtained as the white level information includes abnormal data. When the white level information of some of the colors includes abnormal data, the abnormal data is replaced with correction data which is obtained by multiplying corresponding data that corresponds to the abnormal data according to a predefined principle and included in the white level information of at least one other color not determined to include the abnormal data, by a ratio among the white level information of all of the colors. Hence, where a foreign particle, stain, dust, or the like is on the reference member to cause an abnormality in the white level information of some of the colors that are obtained by reading the reference member, the abnormal part in the white level information determined to include the abnormality can be corrected easily and appropriately, based on the white level information of the other color or colors not determined to include the abnormality.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Hereinafter, there will be described embodiments of the invention, by referring to the accompanying drawings. It is to be understood that the following embodiments are described only by way of example, and the invention may be otherwise embodied with various modifications without departing from the scope and spirit of the invention.

Referring to FIGS. 1-13C, there will be described a first embodiment of the invention.

Figure 1:
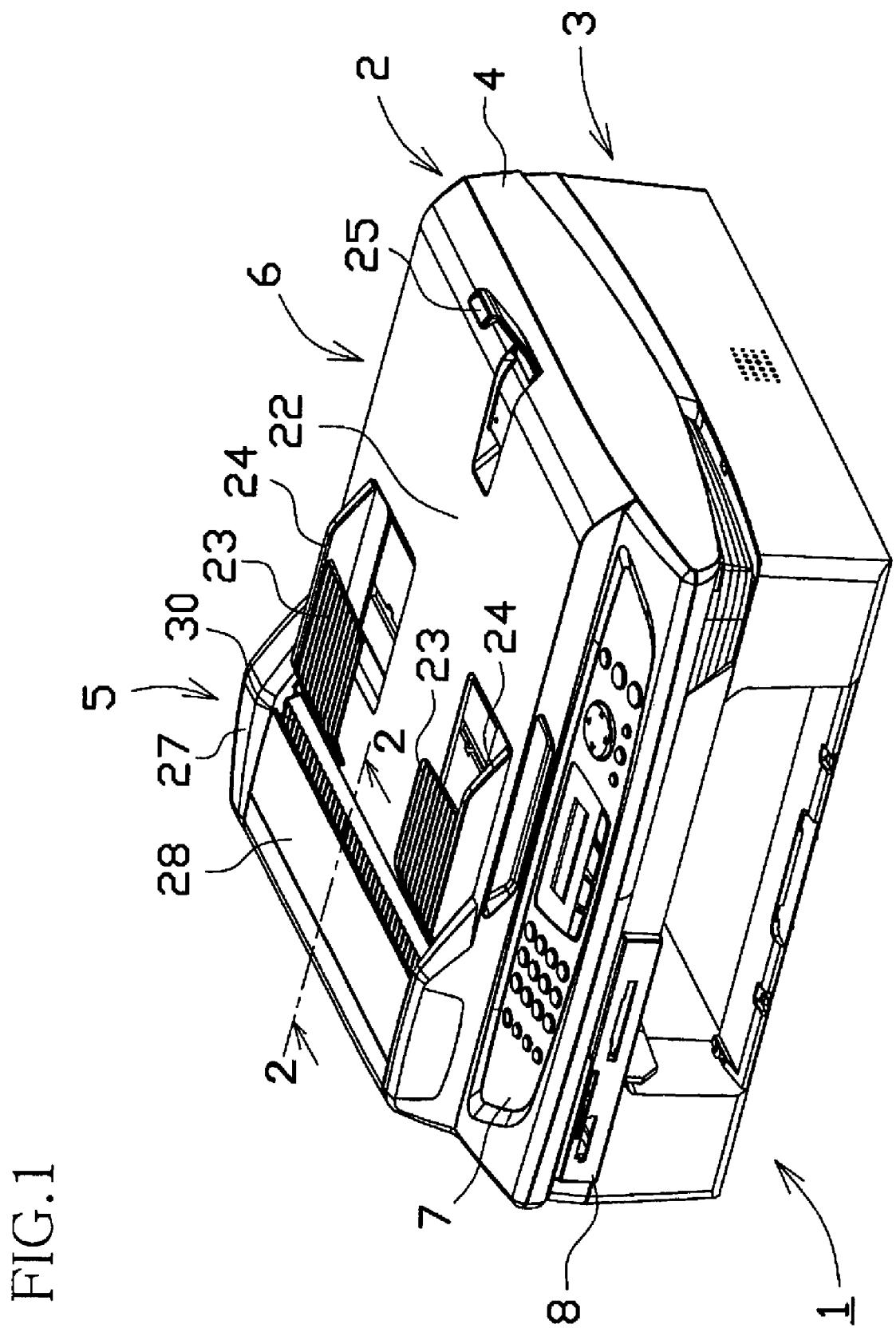
FIG. 1 is an external perspective view of a multifunctional apparatus including a scanner portion as an image reading apparatus according to a first embodiment of the invention.

FIG. 1 is an external view of a multifunctional apparatus according to a first embodiment of the invention. The multifunctional apparatus 1 is a MFD (Multi Function Device) integrally including a scanner function, a printer function, and a facsimile function. An upper portion of the multifunctional apparatus 1 constitutes a scanner portion 2 for reading an image of a document, and a lower portion of the multifunctional apparatus 1 constitutes a printer portion 3 for recording an image on a recording sheet. The scanner portion 2 of the multifunctional apparatus 1 is one example of an image reading apparatus according to the invention, and the other functions such as the printer function are optional. The image reading apparatus of the invention may take the form of a scanner having only a scanner function.

There will be described in detail a structure of the scanner portion 2, by referring also to FIG. 2 that is a schematic cross-sectional view, taken along line 2-2 in FIG. 1, of an ADF (Auto Document Feeder) included in the scanner portion 2.

Figure 2:
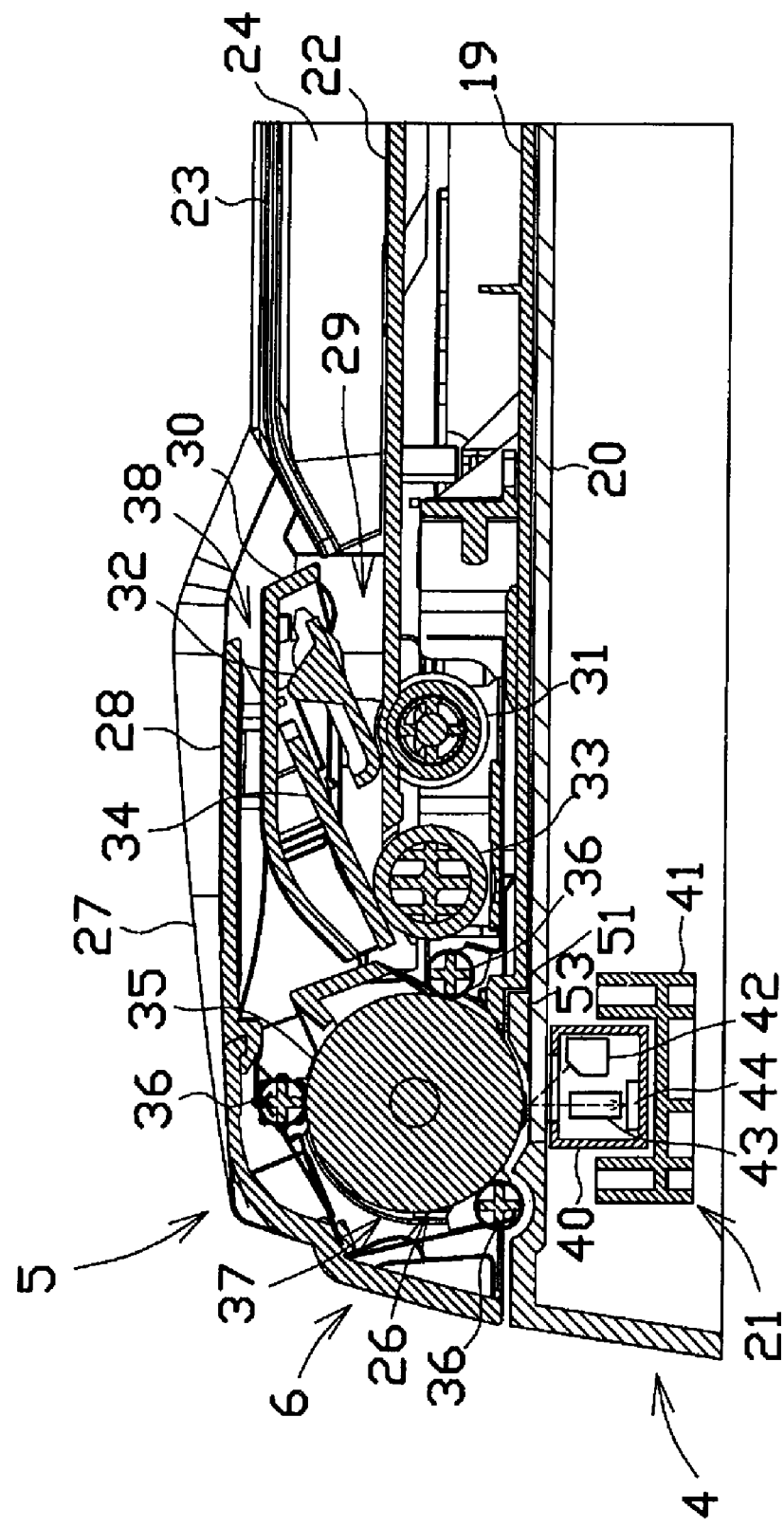
FIG. 2 is a schematic cross-sectional view along line 2-2 in FIG. 1, showing an ADF of the scanner portion.

As shown in FIGS. 1 and 2, the scanner portion 2 includes a cover structure functioning as a document holding member 6, and a reading table 4. The document holding member 6 includes an ADF 5, which is a mechanism for automatically feeding a document in the form of sheets one by one. The reading table 4 functions as a FBS (Flatbed Scanner). The document holding member 6 is attached at a rear side thereof to the reading table 4 by means of a hinge, such that the document holding member 6 is turn-openable/closable relative to the reading table 4. More specifically, the reading table 4 provides a main body of the multifunctional apparatus 1, and an upper surface of the reading table 4 is opposed to the document holding member 6. At the upper surface of the reading table 4, there is disposed a platen glass 20 as a transparent plate. When the document holding member 6 is opened, the platen glass 20 constitutes a part of the upper surface of the reading table 4 that can be exposed to the exterior. Thus, a surface of the platen glass 20 includes an exposed area. When the document holding member 6 is closed, the upper surface of the reading table 4 including the platen glass 20 is entirely covered. The reading table 4 incorporates a reading unit 21 disposed to be opposed to the platen glass 20.

The ADF 5 incorporated in the document holding member 6 operates to sequentially supplies document sheets stacked on a document supply tray 22 one by one into a feed pathway 26 and then feed each document sheet down to a catch tray 23 consisting of two segments. While each document sheet is fed by the ADF 5, the document sheet passes over the platen glass 20, so that the reading unit 21 under the platen glass 20 reads an image on the document sheet. The ADF 5 will be fully described later. On an under surface of the document holding member 6, there is disposed a holding member 19 formed of a sponge material or a white plate, in order to hold down the document on the platen glass 20, which document may be in the form of a sheet or a book, for instance.

On a front side of the reading table 4 is disposed an operator panel 7, in which various manual operation buttons and a liquid crystal display are arranged. The multifunctional apparatus 1 is operated in response to instructions input through the operator panel 7. However, where connected to a computer, the multifunctional apparatus 1 can be operated in response to instructions transmitted from the computer by way of a printer driver, a scanner driver, or others.

At an upper left portion in a front side of the multifunctional apparatus 1, there is disposed a slot portion 8 into which various kinds of recording media in the form of small memory cards can be inserted. When a small memory card containing image data representative of at least one image is inserted into the slot portion 8, the image data is read in and information related to the image data is displayed on the liquid crystal display, so that a user inputs some instructions through the operator panel 7 in order to have the printer portion 3 operate to record one or ones of the at least one image on a recording sheet or sheets, as desired.

As shown in FIGS. 1 and 2, the document holding member 6 includes the document supply tray 22 and the catch tray 23 that are arranged in vertical relation. The document supply tray 22 is formed integrally with an upper surface of the document holding member 6. When images on document sheets are to be read using the ADF 5, a stack of the document sheets is set on the document supply tray 22, with leading edges, in a direction of feeding, of the document sheets inserted in the ADF 5. The document supply tray 22 has a pair of document guides 24 that are spaced from each other in a front-rear direction of the multifunctional apparatus 1. The document guides 24 are slidable in the front-rear direction. The document guides 24 stand from the document supply tray 22, and guide two laterally opposite ends of the stack of document sheets on the document supply tray 22. Movements of the document guides are coupled with each other in a well-known manner, such that when one of the document guides is slid in a direction, the other document guide is slid in the opposite direction.

That is, when a width of the stacked document sheets is relatively small, a front-side one of the document guides is slid rearward, which slides a rear-side one of the document guides frontward. Thus, a distance between the document guides 24 corresponds to the width of the stack of the document sheets that are to be guided by the document guides 24, and the distance is decreased by the sliding movements of the respective document guides 24 which movements are asymmetrical with respect to a substantially center point in the front-rear direction. On the other hand, when the width of the stack of the document sheets is relatively large, the front-side document guide is slid frontward, and the rear-side document guide is slid rearward accordingly, so as to increase the distance between the document guides 24 in order to guide those relatively wide document sheets.

The catch tray 23 is integrally formed with the document guides 24, at a position over the document supply tray 22, with a space therebetween. Each document sheet is ejected from the ADF 5 to be received by the catch tray 23, namely, two widthwise opposite end portions of the document sheet are respectively received on the two segments of the catch tray 23. The document sheets ejected are separated from the stack of the document sheets on the document supply tray 22. A length of the catch tray 23 in the ejecting direction is smaller than that of each document sheet, and thus a leading portion, in the ejecting direction, of the ejected document sheet drops from the catch tray 23 to be received or supported on the document supply tray 22. Thus, the leading portion, in the ejecting direction, of the ejected document sheet overlaps a rear portion, in the feeding direction, of the stack of the document sheets on the document supply tray 22, but a rear portion of the ejected document sheet on the catch tray 23 and a leading portion of the document sheet on the document supply tray 22 are held separated from each other in the presence of the catch tray 23, thereby preventing mixing of the ejected document sheets with the stack of the document sheets yet to be fed. By making the length of the catch tray 23 relatively small, a required space over the document holding member 6 is made small, thereby reducing a thickness and an overall size of the multifunctional apparatus 1.

At a lateral end of the document supply tray 22 remote from the ADF 5, there is disposed a document stopper 25 that is operable between a standing position and a lying position. At the standing position, the document stopper 25 stands from a surface of the document supply tray 22. At the lying position, the document stopper 25 becomes flush with the surface of the document supply tray 22. For instance, when a document sheet having the substantially same size as the surface of the document supply tray 22 is ejected from the ADF 5 while the document stopper 25 is in the standing position as shown in FIG. 1, the document sheet is prevented from slipping down off the document supply tray 22 by being stopped by the document stopper 25. By disposing the document stopper 25 for thus receiving the document sheet as ejected, an area of the document supply tray 22 can be reduced, in turn enabling to reduce the size of the document holding member 6 integrally including the document supply tray 22. When not in use, the document stopper 25 is laid flat in order not to protrude from the document holding member 6. When shipped or stored, the multifunctional apparatus 1 is made compact in size by thus laying the document stopper 25 flat.

As shown in FIG. 2, inside the ADF 5 is formed the feed pathway 26 in a sideways U-like shape, that connects the document supply tray 22 to the catch tray 23. The feed pathway 26 is defined by an ADF mainbody 27 integral with the document holding member 6, and an ADF cover 28 turn-openable/closable relative to the ADF mainbody 27. As shown in FIG. 2, the ADF 5 includes a feed-in chute 29 formed as a passage having some width or vertical dimension by being defined between a horizontal surface that extends in the ADF mainbody 27 continuously from the document supply tray 22, and a partition plate 30 disposed inside the ADF cover 28. The feed pathway 26 is formed in a substantially sideways U-shape, namely, extends from the feed-in chute 29 to an ejecting chute 38 via a curved portion 37. The curved portion 37 and the ejecting chute 38 are also continuously formed as a passage having some width or vertical dimension by being defined by members such as the ADF mainbody 27, the ADF cover 28, and the partition plate 30.

In the feed pathway 26, means for feeding a document sheet is disposed. More specifically, as shown in FIG. 2, the feeding means is constituted by a combination of a feed-in roller 31 and a feed-in nip member 32 in pressing contact with the feed-in roller 31, a combination of a separating roller 33 and a separation nip member 34 in pressing contact with the separating roller 33, and a combination of a feeder roller 35 and a plurality of pinch rollers 36 each in pressing contact with the feeder roller 35. It is noted that the structure of the rollers and nip members is described by way of example only, and the feeding means may be replaced with any other known means. For instance, the number of the rollers and the positions thereof may be changed, and each nip member may be replaced by a pinch roller.

As shown in FIG. 2, the feed-in roller 31 is rotatably disposed substantially at a center of the feed-in chute 29, with a part of an outer circumferential surface of the feed-in roller 31 exposed from a horizontal upper surface of the ADF mainbody 27. The separating roller 33 is disposed in a similar manner as the feed-in roller 31, at a position spaced from the feed-in roller 31 in the feeding direction. That is, a part of an outer circumferential surface of the separating roller 33 is exposed from the horizontal upper surface of the ADF mainbody 27, such that the separating roller 33 is rotatable. A driving force of a document feeder motor 62 (shown in FIG. 7) is transmitted to the separating roller 33 and the feed-in roller 31 to rotate these rollers. The feed-in roller 31 and the separating roller 33 have a same diameter, and these rollers 31, 33 are rotated at a same speed. The driving force of the document feeder motor 62 is transmitted to the feed-in roller 31 via a single-cycle clutch interposed therebetween so that idle rotation of the feed-in roller 31 is allowed up to a single full turn.

The feed-in nip member 32 is disposed on the partition plate 30 and at a position opposed to the feed-in roller 31, such that the feed-in nip member 32 is displaceable toward and away from the feed-in roller 31. The feed-in nip member 32 is elastically biased downward by a spring member not shown, to be held in pressing contact with the outer circumferential surface of the feed-in roller 31 in a state where a document sheet is not nipped between the feed-in nip member 32 and the feed-in roller 31. Similarly, the separation nip member 34 is disposed on the partition plate 30 and at a position opposed to the separating roller 33, such that the separation nip member 34 is displaceable toward and away from the separating roller 33, and the separation nip member 34 is elastically biased downward by a spring member not shown, and held in pressing contact with an outer circumferential surface of the separating roller 33 in a state where a document sheet is not nipped between the separation nip member 34 and the separating roller 33. Each document sheet is pressed onto the feed-in and separating rollers 31, 33 by the feed-in and separation nip members 32, 34, and thereby nipped therebetween, so that the torque of the feed-in and separating rollers 31, 33 is transmitted to the document sheet.

The feeder roller 35 is disposed at the curved portion 37 of the substantially sideways U-shaped feed pathway 26. The feeder roller 35 has an outer circumferential surface that partially constitutes the curved portion 37, and thus has a diameter suitable for the curved portion 37. Like the feed-in roller 31 and separating roller 33, the feeder roller 35 receives the driving force of the document feeder motor 62, to be rotated thereby.

Around the feeder roller 53, there are disposed three pinch rollers 36 at respective positions. A shaft of each pinch roller 36 is elastically biased by a spring member and supported by the ADF mainbody 27 or the ADF cover 28 such that each pinch roller is rotatable and held in pressing contact with the outer circumferential surface of the feeder roller 35. Each pinch roller 36 rotates with the feeder roller 35. The document sheet is pressed onto the feeder roller 35 by the pinch rollers 36 so that the torque of the feeder roller 35 is transmitted to the document sheet.

On the downstream side of the feeder roller 35 with respect to the feeding direction, there is defined the ejection chute 38 between the ADF cover 28 and the partition plate 30. The ejection chute 38 is continuous from the curved portion 37 of the feed pathway 26 defined between an interior surface of the ADF cover 28 and the feeder roller 35. Hence, the document sheet supplied into the feed pathway 26 from the sheet feed tray 22 is sequentially fed through the feed-in chute 29, the curved portion 37, and the ejection chute 38, to be eventually ejected onto the catch tray 23.

The ADF cover 28 is pivotably supported at a position on a side of the feed-in roller 31 near the sheet feed tray 22, so that the ADF cover 28 can be opened by being turned upward. When the ADF cover 28 is opened, the feed-in chute 29 and the curved portion 37 are exposed to the exterior, and the feed-in roller 31 and the separating roller 33 are respectively separated from the feed-in nip member 32 and separation nip member 34. The ADF cover 28 is opened, when a paper jam occurs in the feed pathway 26 and the caught paper is to be eliminated, or when a maintenance work for members inside the ADF 5 is to be implemented.

Figure 3:
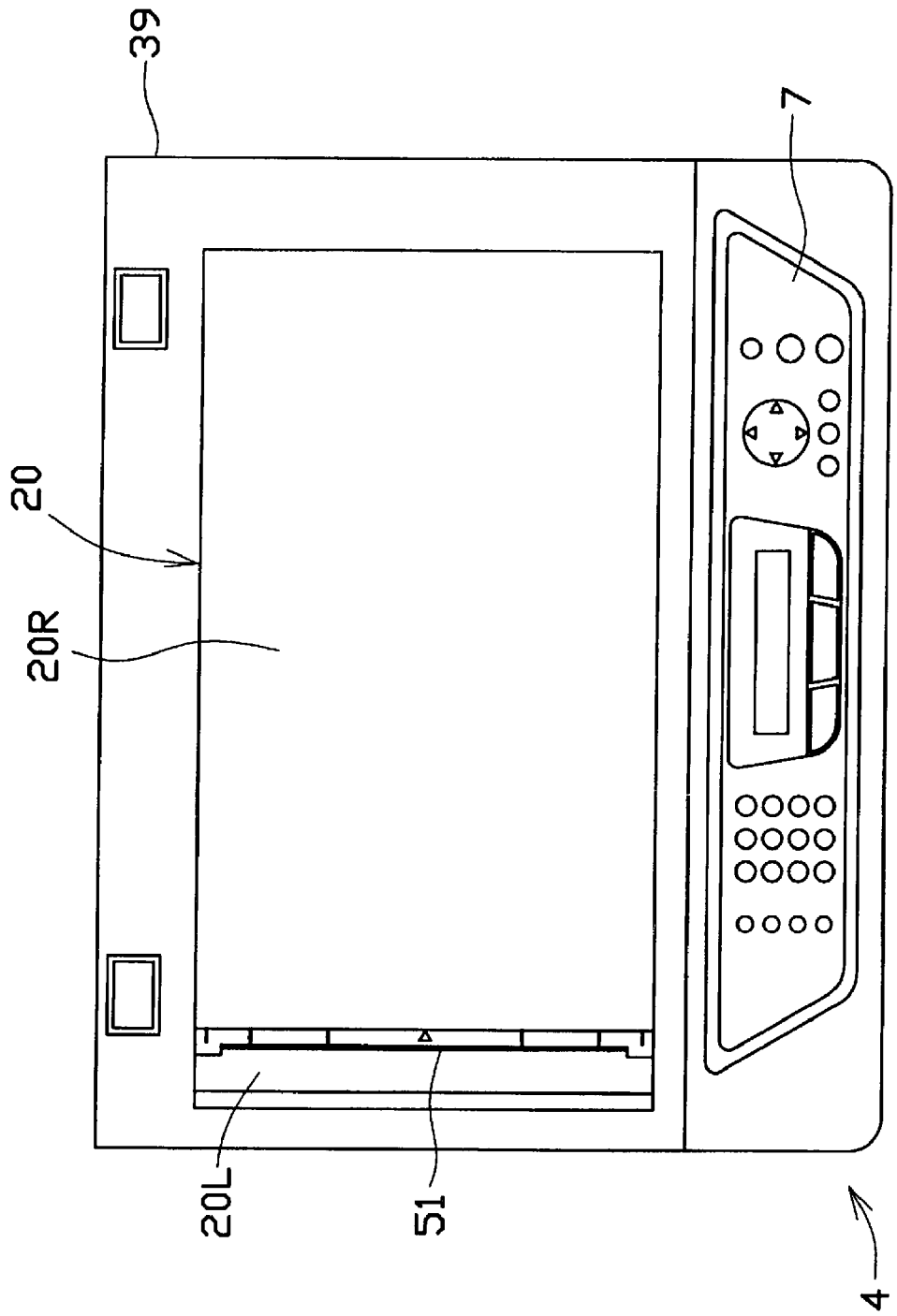
FIG. 3 is a schematic plan view of a reading table of the scanner portion.

As shown in FIGS. 2 and 3, the platen glass 20 is disposed at the upper surface of the reading table 4, and a document sheet is placed on the platen glass 20 in the case where the scanner portion 2 is used as a FBS. The platen glass 20 may be a transparent glass plate. A housing 39 of the reading table 4 has an opening at a center of an upper side thereof, in order to expose the platen glass 20 to the outside. The paten glass 20 has horizontal dimensions sufficiently larger than those of the opening. An area over which the platen glass 20 is exposed through the opening corresponds to a document reading area.

The reading unit 21 is incorporated inside the housing 39 of the reading table 4, or on a side of the platen glass 20 opposite to a document setting surface thereof on which a document is placed. The housing 39 is made of synthetic resin, and includes a support rib for supporting the platen glass 20, bosses for screwing various members to the housing 39, a through-hole for electrical wiring or for other purposes, and a partition plate dividing an internal space of the housing 39 into a portion in which the reading unit 21 is disposed and another potion in which a circuit board for the operator panel 7 is disposed. These parts or members may be suitably designed depending on how the reading table 4 is implemented, and detailed description thereof is omitted.

As shown in FIG. 2, the reading unit 21 includes a CIS unit 40 as an image reading device, a carriage 41 as a scanning device, and a scanning mechanism (not shown). The CIS unit 40 is an image sensor or image reading device of close-contact type including light sources 42, lenses 43, and light receiving elements 44, which are arranged in respective rows. That is, there are one row of light sources 42, one row of lenses 43, and one row of light receiving elements 44. The row of light sources 42 is for emitting light of red (R), green (G), and blue (B) according to a color separation technology, toward the document sheet on the platen glass 20. The thus emitted light of R, G, and B is transmitted through the platen glass 20 to be reflected by the document sheet. The reflected light of R, G, and B is respectively concentrated on the row of the light receiving elements 44 by the row of lenses 43, and the row of the light receiving elements 44 convert the received light of R, G, and B into electrical signals. The row of the light receiving elements 44 extends in a width direction of the document sheet, i.e., an axial direction of the feeder roller 35, for instance, such that a number of light receiving elements 44 forms a unit (subgroup) and is integrally mounted on a single chip. The row of the light sources 42 and that of the lenses 43 also extends in the same direction. As the light sources 42, LEDs (Light Emitting Diodes) of the respective colors, namely, red, green, and blue, are used, according to the color separation technology.

Although in this embodiment the light receiving elements are arranged in a single row, the invention is not limited thereto. It may be arranged such that a plurality of rows of light receiving elements are disposed in the CIS unit 40.

Figure 4:
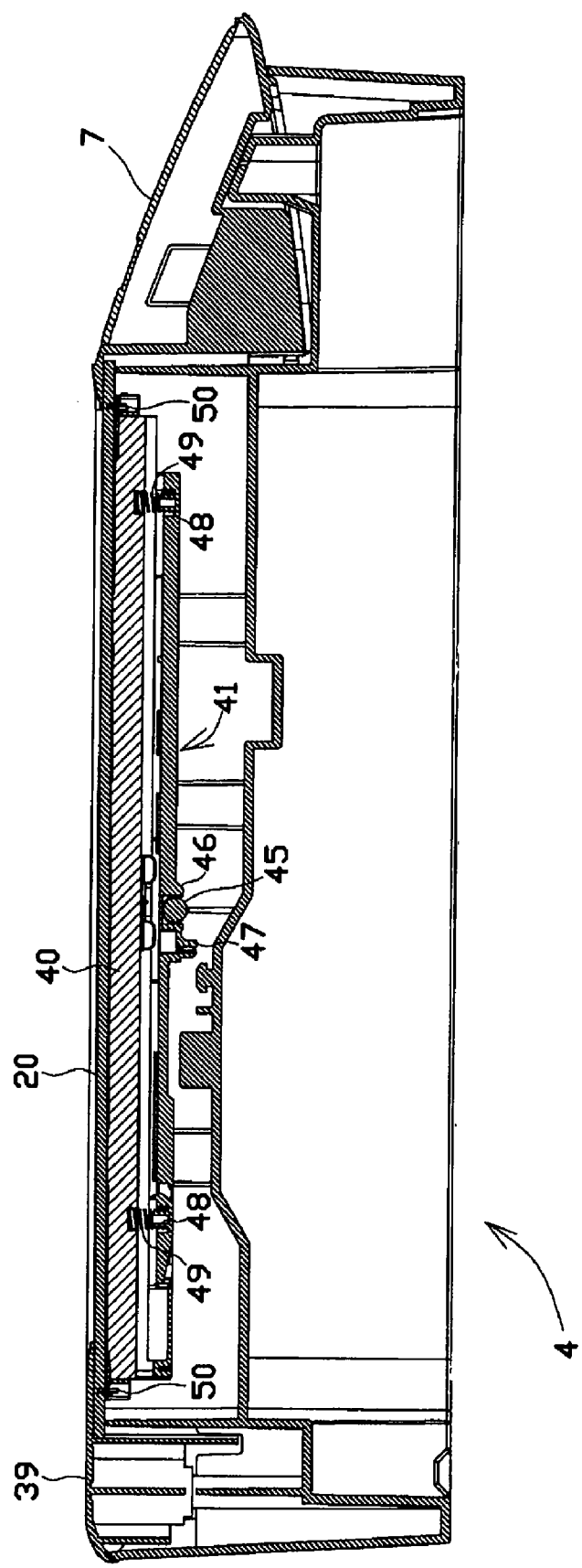
FIG. 4 is a vertical cross-sectional view of the reading table in which a carriage is disposed.

As shown in FIG. 4, the CIS unit 40 is mounted on the carriage 41 and held in contact with the platen glass 20. The carriage 41 is disposed to be capable of scanning or reciprocating under the platen glass 20 by being driven by the scanning mechanism in the form of a belt drive mechanism (not shown). The carriage 41 is engaged with a guide shaft 45 extending across a width of the housing 39 of the reading table 4, and is slid on and along the guide shaft 45 by the belt drive mechanism. By moving the carriage 41 along the guide shaft 45, the CIS unit 40 mounted in the carriage 41 and held in close contact with the platen glass 20 scans or is reciprocated along the surface of the platen glass 20.

Thus, the carriage 41 carries the CIS unit 40 thereon, as shown in FIG. 4. On an under surface of the carriage 41 is formed a shaft receiving portion 46 that is fitted on the guide shaft 45 from the upper side. With the shaft receiving portion 46 fitted on the guide shaft 45, the carriage 41 is supported and slidable on the guide shaft 45 along an axial direction thereof. A belt holding portion 47 is formed at a side of the shaft receiving portion 46, to protrude downward. The belt holding portion 47 holds a timing belt of the belt drive mechanism, thereby coupling the timing belt with the carriage 41. By this arrangement, a drive force is transmitted from the belt drive mechanism to the carriage 41, thereby moving the carriage 41 on and along the guide shaft 45. The belt drive mechanism is constructed, for instance, such that the timing belt is wound around a drive pulley and a driven pulley, and a drive force of a motor is input to a drive shaft of the drive pulley, so that the timing belt is circulated by rotation of the drive pulley.

On an internal side of the carriage 41 on which is mounted the CIS unit 40, two spring receiving portions 48 are disposed at respective positions separate in a lateral direction of the apparatus 1. Between the CIS unit 40 and the carriage 41 are interposed two coil springs 49 respectively positioned by the spring receiving portions 48. The coil springs 49 press the CIS unit 40 as mounted on the carriage 41, against the under surface of the platen glass 20, in order to hold the CIS unit 40 in close contact with the platen glass 20. At opposite two ends of the CIS unit 40, there are respectively disposed rollers 50 that allow the CIS unit 40 as pressed against the under surface of the platen glass 20 to smoothly move while held in close contact therewith, when the carriage 41 is moved.

As shown in FIG. 3, a partitioning member 51, which is a plate-like member long in a front-rear direction of the reading table 4, that is, an extending direction of the reading unit 21, is disposed on the platen glass 20 within the exposed area, in order to divide the exposed area into two sections in a lateral direction of the multifunctional apparatus 1. As shown in FIG. 2, the platen glass 20 extends such that an end portion thereof (i.e., a left end portion as seen in FIG. 2) is disposed under the feeder roller 35 to constitute a reading surface used when image reading is performed using the ADF 5.

An end portion of the platen glass 20, which is opposite the end portion serving as the reading surface when an image is read using the ADF 5, constitutes the document setting surface used when the scanner portion 2 is operated as a FBS. Thus, the partitioning member 51 divides in the lateral direction the exposed area of the platen glass 20 into two sections, namely, a fed-document reading area 20L functioning as the reading surface used in the case of reading an image using the ADF 5, and a stationary-document reading area 20R functioning as the document setting surface used in the case of reading an image by operating the scanner portion 2 as a FBS. When a document in the form of a sheet (hereinafter referred to as "document sheet") is placed on the stationary-document reading area 20R, the partitioning member 51 serves as a reference for positioning of the document sheet. On the partitioning member 51, there are put a plurality of marks including a center mark put on the partitioning member 51 at a longitudinal center thereof, and marks indicating positions of two opposite ends of document sheets of various sizes, such as A4 and B5, in the front-rear direction of the apparatus 1. When a document sheet is positioned on the stationary-document reading area 20R, the center mark serves as a fiducial point.

Figure 5:
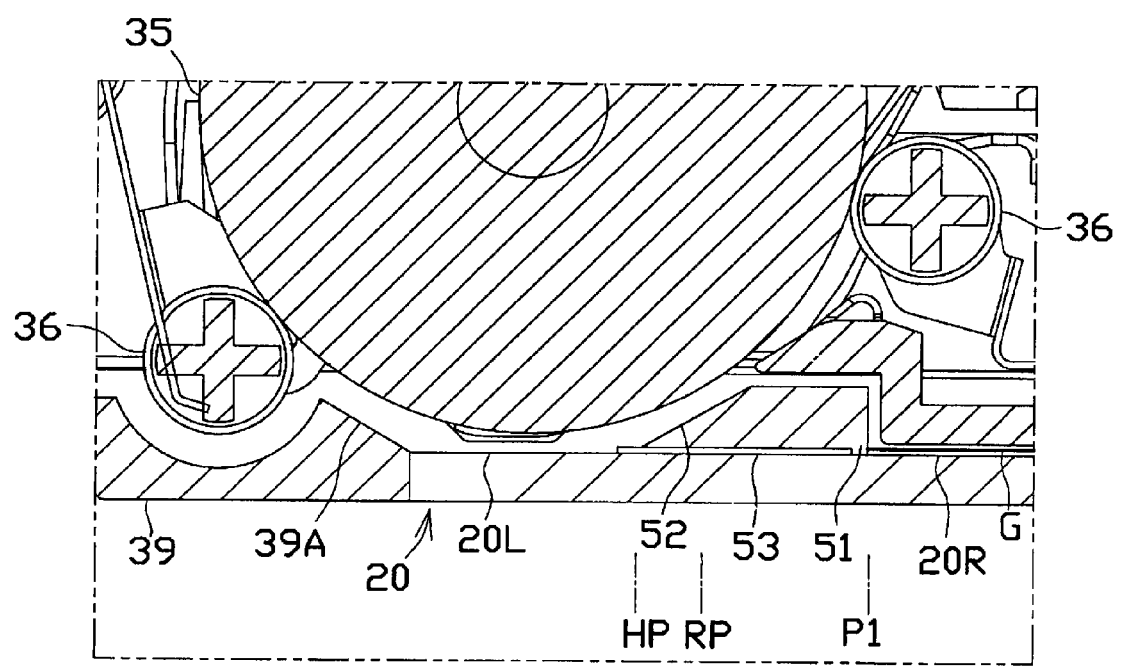
FIG. 5 is an enlarged cross-sectional view of the scanner portion, showing a reference member and its vicinity.

As shown in FIG. 5, a surface of the partitioning member 51 that is opposed to the document holding member 6 includes a guide surface 52. More specifically, the guide surface 52 is formed by gradually reducing a thickness of the partitioning member 51 at a portion of the partitioning member 51 that is opposed to the feeder roller 35, such that the guide surface 52 gradually approaches the platen glass 20 toward the fed-document reading area 20L. The guide surface 52 guides a leading edge of the document sheet supplied from the document supply tray 22, to the fed-document reading area 20L, before the document sheet reaches the feed pathway 26.

In the present embodiment, the ADF 5 is configured such that the catch tray 23 is disposed above the document supply tray 22 so that the document sheet is fed upward along the sideways U-shaped feed path and the guide surface 52 in the partitioning member 51 guides the document yet to be read, to the fed-document reading area 20L. However, the ADF 5 may be configured such that the document supply tray 22 is disposed above the catch tray 23 so that the document sheet is fed downward along a U-shaped feed path and the guide surface 52 of the partitioning member 51 guides the document sheet, as having been read, from the fed-document reading area 20L to the catch tray 23.

As shown in FIG. 5, a reference member 53 is interposed between an under surface of the partitioning member 51 and the platen glass 20. The reference member 53 provides a luminosity reference with respect to the CIS unit 40. That is, an image as read by the CIS unit 40 is subjected to a shading correction based on reference data that is based on white level information and black level information obtained with respect to, or using, the reference member 53.

Figure 6:
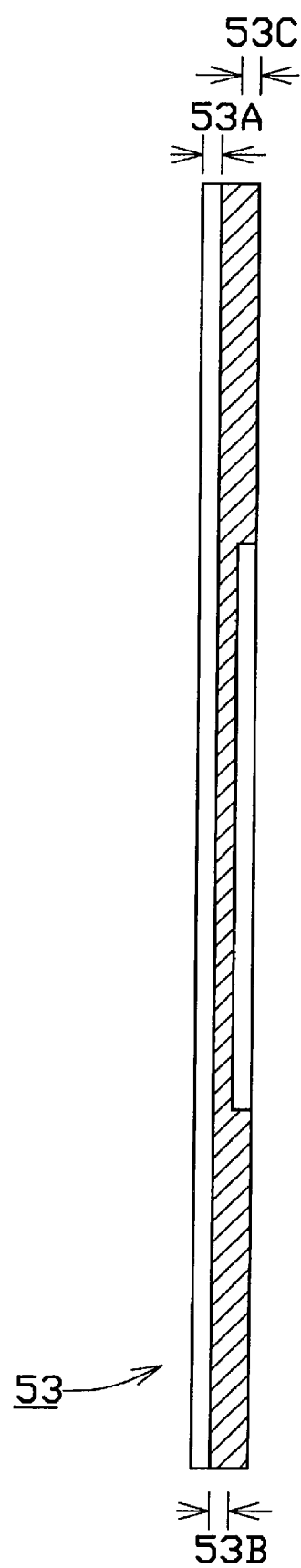
FIG. 6 is a plan view of the reference member.

The reference member 53 is a thin band-shaped member covering an almost entire length of the under surface of the partitioning member 51. As shown in FIG. 6, the reference member 53 has three areas arranged in an auxiliary scanning direction for the CIS unit 40, that is, the lateral direction as seen in FIG. 6. A left one 53A of the three areas is a white-colored area, and used for an adjustment of an amount of light emitted from the CIS unit 40 (which may be simply referred to as "the light amount adjustment" hereinafter), and for obtaining white level information. The amount of the light emitted from the CIS unit 40 may be adjusted by adjusting a time period during which the light is emitted, or by adjusting an intensity of the light, for instance. A middle one 53B of the three areas is a black-colored area, and used for obtaining black level information with respect to the CIS unit 40. A boundary between the left and middle areas 53A, 53B serves as a reference with respect to the auxiliary direction of the CIS unit 40. A right one 53C of the three areas is white-colored at an intermediate portion in the front-rear direction, and black-colored on the opposite sides of the white intermediate portion. The right area 53C serves as a reference with respect to a main scanning direction of the CIS unit 40. The reference member 53 is interposed between the partitioning member 51 and the platen glass 20, such that the areas 53A-53C extend in a direction parallel to the direction in which the CIS unit 40 extends.

Figure 7:
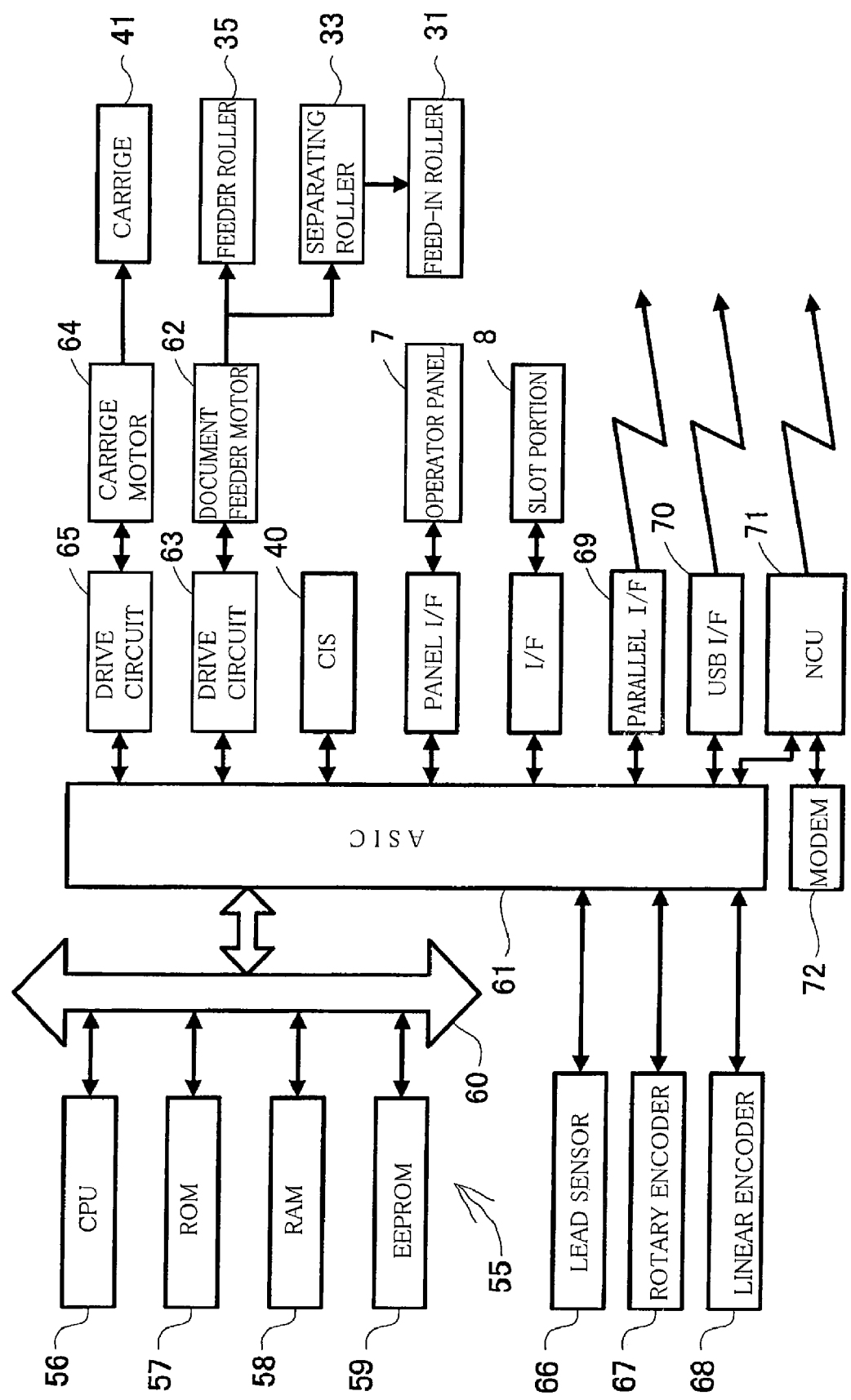
FIG. 7 is a black diagram of a control unit of the multifunctional apparatus.

FIG. 7 shows a structure of a control unit 55 of the multifunctional apparatus 1. The control unit 55 generally controls operation of the multifunctional apparatus 1, that is, the control unit 55 controls not only the scanner portion 2, but also the printer portion 3. Since description of constituent elements of the printer portion 3 is not essential in the present embodiment, the constituent elements are not shown in FIG. 7. The control unit 55 takes the form of a microcomputer principally constituted by a CPU 56, a ROM 57, a RAM 58, an EEPROM (Electrically Erasable and Programmable ROM) 59. The control unit 55 is connected to an ASIC (Application Specific Integrated Circuit) 61 via a bus 60, as shown in FIG. 7.

The ROM 57 stores programs according to which various operations of the multifunctional apparatus 1 are controlled, and others. The RAM 58 is used as a storage area or a working area for temporarily registering various kinds of data used when the CPU 56 executes the above-mentioned programs. For instance, the RAM 58 stores various settings related to the light sources 42 of the CIS unit 40, and the white level information and the black level information obtained by reading the reference member 53. The EEPROM 59 is a storage area for storing various settings, the status of flags, and other data that should be retained even after the multifunctional apparatus 1 is powered off. The CPU 56, the ROM 57, the RAM 58, and the EEPROM 59 constitute a ratio calculator, an abnormal-data determiner, and a data corrector.

The ASIC 61 generates signals including phase signals to be supplied to the LF motor or the document feeder motor 62, in response to commands from the CPU 56. The phase signals are sent to a drive circuit 63 of the document feeder motor 62 to control operation of the document feeder motor 62 by supplying drive signals to the document feeder motor 62 via the drive circuit 63.

The drive circuit 63 is for driving the document feeder motor 62 that is connected to the feed-in roller 31, the separating roller 33, and the feeder roller 35. That is, the drive circuit 63 generates, upon receiving an output signal from the ASIC 61, electrical signals for rotating the document feeder motor 62. Upon receiving the electrical signals, the document feeder motor 62 rotates, and the torque of the document feeder motor 62 is transmitted to the separating roller 33 and the feeder roller 35 via a well-known drive mechanism including a gear and a drive shaft.

Similarly, the ASIC 61 generates signals including phase signals to be supplied to a carriage motor or a CR motor 64, in response to commands from the CPU 56. The phase signals are sent to a drive circuit 65 of the CR motor 64 to control operation of the CR motor 64 by supplying drive signals to the CR motor 64 via the drive circuit 65.

The drive circuit 65 is for driving the CR motor 64 of the belt drive mechanism connected to the carriage 41, and generates electrical signals for rotating the CR motor 64 upon receiving an output signal from the ASIC 61. The CR motor 64 rotates upon receiving the electrical signals, and the torque of the CR motor 64 is transmitted to the carriage 41 via a well-known belt drive mechanism, in order to laterally move or reciprocate the carriage 41.

To the ASIC 61 are connected a lead sensor 66, a rotary encoder 67, and a linear encoder 68. The lead sensor 66 detects the document sheet in the feed pathway 26, the rotary encoder 67 detects an amount of rotation of the separating roller 33 and feeder roller 35, and the linear encoder 68 detects an amount of a movement of the carriage 41.

To the ASIC 61 is connected the CIS unit 40, which reads the image on the document sheet as fed along the feed pathway 26. In accordance with a control program stored in the ROM 57, the light amount adjustment, the acquisition of the white level information and black level information, and the image reading are performed.

To the ASIC 61 are further connected: the operator panel 7 through which instructions related to operations of the multifunctional apparatus 1 are inputted; the slot portion 8 into which various kinds of small memory cards are inserted; a parallel interface 69 and a USB interface 70 each connected, via a parallel cable and a USB cable, respectively, to an external device such as personal computer, to allow data transfer therebetween; a NCU (Network Control Unit) 71 implementing the facsimile function; and a MODEM 72.

There will be now described an operation to read an image using the scanner portion 2.

When the scanner portion 2 is used as a FBS, the document holding member 6 is turn-opened and a document is placed on the platen glass 20 within the stationary-document reading area 20R. Then, the document holding member 6 is turn-closed, to fix the document in position on the platen glass 20. Thereafter, a user presses a start button in the operator panel 7, thereby having the control unit 55 operate the carriage 41 to move along the platen glass 20. While the carriage 41 is thus moved, the CIS unit 40 reads an image on the document placed within the stationary-document reading area 20R on the platen glass 20.

On the other hand, when the ADF 5 is to be used for reading an image on a document, the document holding member 6 is closed with respect to the reading table 4, and then the document is set in the document supply tray 22. The document may be a single sheet, or a plurality of sheets. For instance, where images on a respective plurality of document sheets of a same size are to be read, the document sheets are stacked and trued up, and an end portion of the stack is inserted from the document supply tray 22 into the feed-in chute 29.

Then, a user presses the start button of the operator panel 7, thereby having the control unit 55 operate a motor to rotate the feed-in roller 31, the separating roller 33, and the feeder roller 35, at predetermined timings. Then, a downmost one of the document sheets which one directly contacts the feed-in roller 31 and separating roller 33 that are rotating is separated from the other document sheets and supplied into the feed pathway 26, and this is repeated so that the document sheets are sequentially supplied into the feed pathway 26 one by one. The supplied document sheet is then fed along the feed pathway 26 down to the fed-document reading area 20L, where the image on the document sheet is read by the CIS unit 40 held stationary under the fed-document reading area 20L. The document sheet whose image has been read is ejected from the ejecting chute 38 onto the catch tray 23.

In the above-described image reading operation involving the scanner portion 2, before the CIS unit 40 initiates the reading the image on the document, there are implemented an adjustment of an output of the CIS unit 40, namely, the adjustment of the light amount of the light sources 42 (i.e., the light amount adjustment), and the acquisition of the white level information and black level information.

Referring now to FIGS. 5-13, there will be described in detail the image reading operation. Initially, the control unit 55 moves the carriage 41 to a reference position RP. This reference position RP corresponds to the boundary between the white left area 53A and the black middle area 53B in the reference member 53, and detectable by detecting a change in signals representing colors and outputted from the CIS unit 40. Namely, when the output of the CIS 40 changes from a signal representative of the white color to a signal representative of the black color, it is determined that the boundary between the white left area 53A and black middle area 53B is detected. Then, prior to the image reading, the carriage 41 is moved to a position under the reference member 53, that is, to a home position HP shown in FIG. 5. The home position HP corresponds to the white area 53A in the reference member 53. Thus, a position corresponding to the reference member 53 is determined to be the home position HP, which is a standby position of the CIS unit 40.

Figure 8:
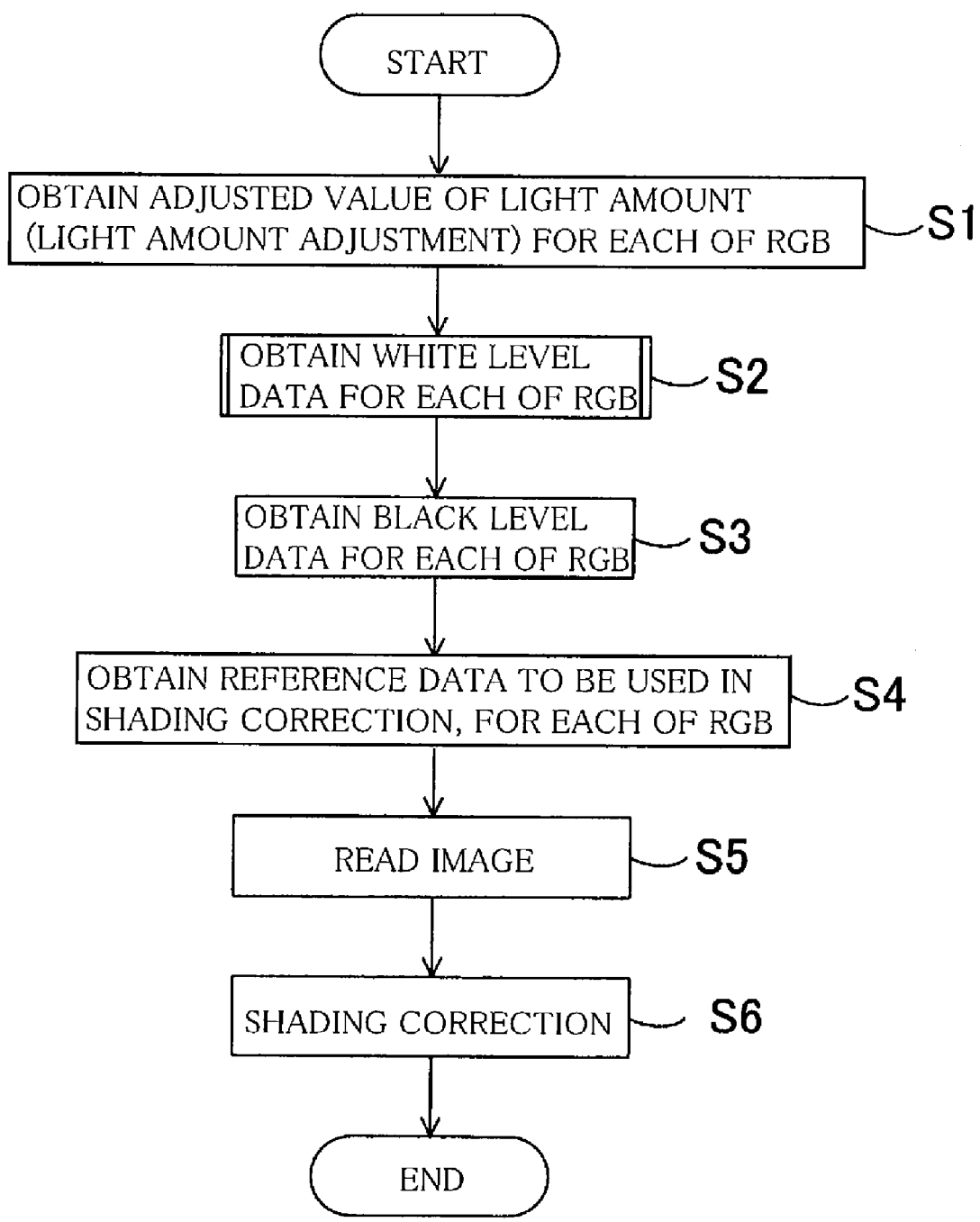
FIG. 8 is a flowchart illustrating an image reading operation routine according to which the control unit operates the scanner portion to read an image on a document.

An operation of the control unit 55 to implement the image reading operation will be described by referring to a flowchart of FIG. 8 illustrating the aforementioned control program, or an image reading operation routine, executed by the control unit 55. The routine or control flow is initiated with step S1 in which the control unit 55 operates to implement the light amount adjustment for the light sources 42 of each color of the CIS unit 40, by using the reference member 53. More specifically, the white area 53A of the reference member 53 is initially irradiated with light of each color emitted from the light sources 42 in a sufficiently small amount. At this time, an amount of the reflected light of each color from the white area 53A and accordingly an output of the light receiving elements 44 of the CIS unit 40 is small. The amount of the light of each color emitted from the light sources 42 is stepwise increased until the output of the light receiving elements 44 reaches a desired level. The amount of the light of each color as emitted from the light sources 42 at the moment when the CIS output reaches the desired level is determined to be an adjusted value of the amount of the light of the color, and the thus adjusted value for each of the colors, i.e., red, green, and blue, is stored in the RAM 58.

Subsequently, the control flow goes to steps S2 and S3 in which the control unit 55 operates to obtain the white level information and the black level information of the CIS unit 40 for each of the RGB colors, with respect to the reference member 53.

Figure 9:
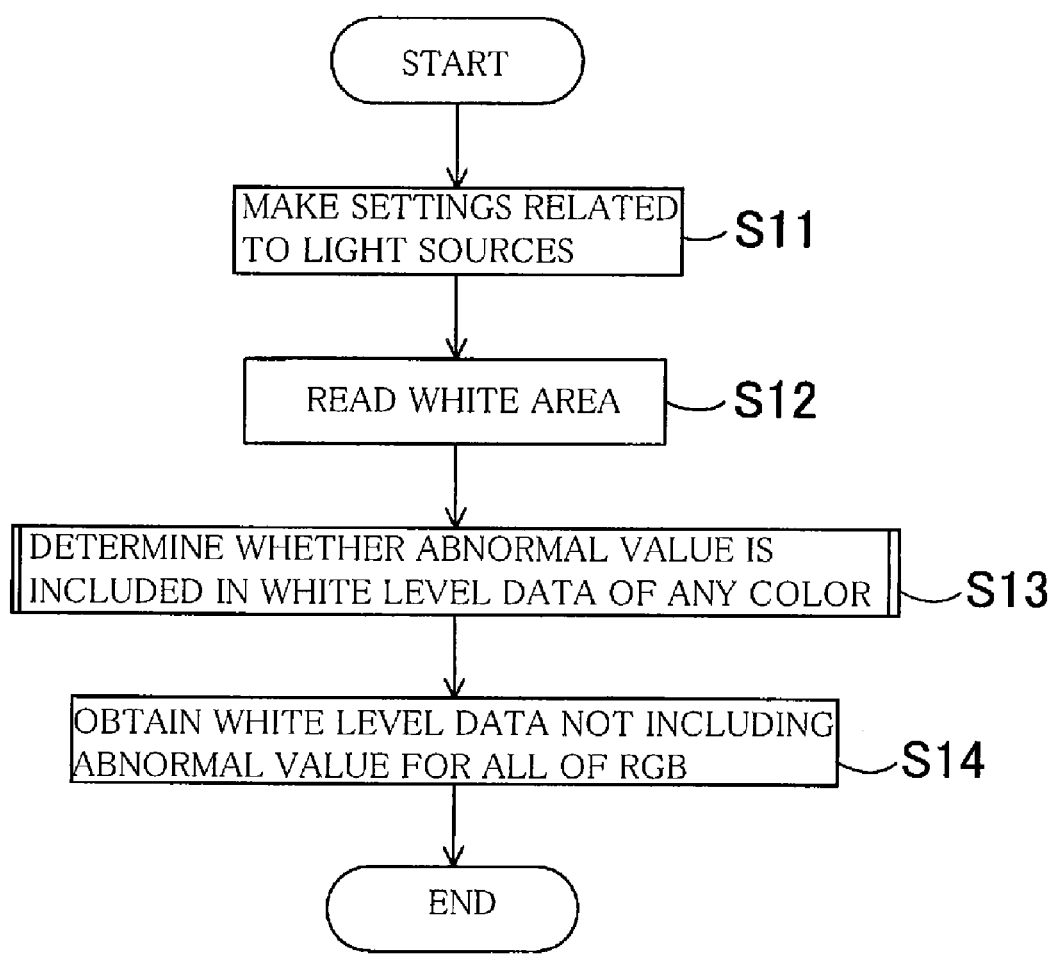
FIG. 9 is a flowchart illustrating a white-level-information obtaining routine.

There will be described in detail the operation to obtain the white level information, referring to a flowchart of FIG. 9 illustrating a white-level-information obtaining routine. The white-level-information obtaining routine begins with step S11, in which the control unit 55 makes various settings in regard to the light sources 42, including an electric current supplied to the light sources 42, a time period during which the light sources 42 are powered on to emit the light, an offset value, a gain, and a number of times the CIS unit 40 reads the white area 53A of the reference member 53 for the acquisition of the white level information, based on the adjusted value of the amount of the light to be emitted from the light sources 42 and the various settings stored in the EEPROM 59. The control flow then goes to step S12 in which the control unit 55 operates to read the white area 53A or obtain the white level information, namely, operates the carriage motor 64 to move the carriage 41 to the home position HP corresponding to the white left area 53A in the reference member 53, at which the light sources 42 for each of RGB of the CIS unit 40 emit the light of the color toward the white area 53A. The reflected light of each color from the white area 53A is received by the light receiving elements 44 and converted into electrical signals.

The acquisition of the white level information may be implemented such that the white area 53A is read a plurality of times to obtain a plurality of values as a cluster of data and an average of the values is used as the white level information. Alternatively, the acquisition of the white level information may be implemented such that a plurality of places in the white area 53A are respectively read by the row of the light receiving elements 44 of the respective colors, while the carriage 41 is moved within a range of the white area 53A. In the latter case, it is expected that even where there is a foreign particle, flaw, or the like at a first place on the white area 53A and the white level information for some of the three colors RGB is accordingly affected by the foreign particle or others adversely, the white level information for the other color or colors, which is obtained by reading another place or places in the white area 53A than the first place, is not affected by the foreign particle or the like and does not include abnormal data. That is, it is prevented that the foreign particle or the like adversely affects a same or corresponding position in the white level information of all the colors RGB.

Subsequently, the control flow goes to step S13 in which the control unit 55 determines whether abnormal data is included in the white level information obtained for each of the colors, which white level information takes the form of a set of data of a quantity associated with the level of the luminosity of, or the amount of the light from, the white area 53A. Hereinafter, the white level information obtained with respect to a color may be referred to as a set of data for a color, or the like, where appropriate.

Figure 10:
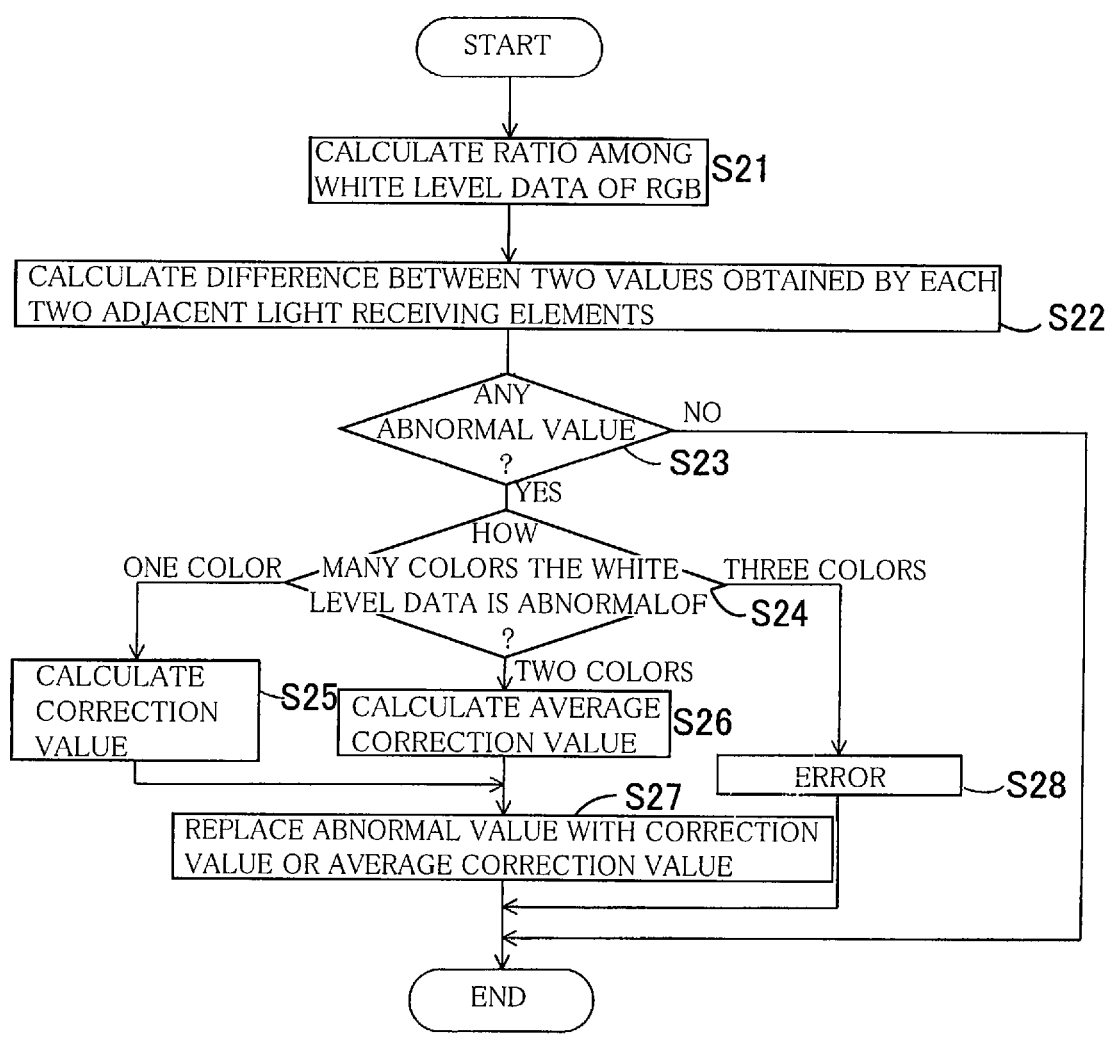
FIG. 10 is a flowchart illustrating an abnormality determination routine.

The abnormal-data determination will be described in detail, referring to a flowchart of FIG. 10 illustrating an abnormality determination routine. The control flow begins with step S21 in which the control unit 55 calculates a ratio of the white level information among the colors RGB. That is, there is calculated a ratio of the white level information for each of two of the three colors RGB other than the white level information of one of the colors RGB that is at the highest level or has the largest value among the three colors RGB, to the white level information of the highest level. More specifically, where the white level information shown in FIGS. 11A-11C is obtained for the respective colors RGB, a ratio of data of the white level information of green (G) shown in FIG. 11B and data of the white level information of blue (B) shown in FIG. 11C, to data of the white level information of red (R) shown in FIG. 11A is obtained.

Figure 11A:
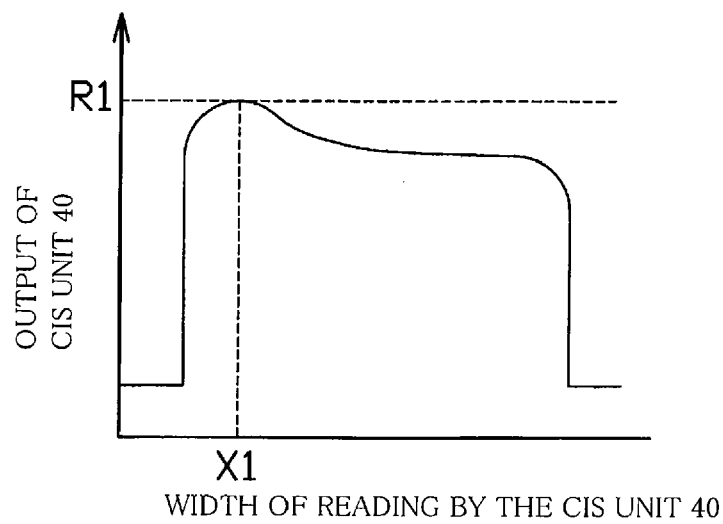
FIGS. 11A, 11B, and 11C are graphs of a quantity obtained as white level information, for red (R), green (G), and blue (B), respectively, in a case where a foreign material, flaw, or the like, which results in an abnormality in some of sets of data of the quantity obtained with respect to the respective colors, is not on the reference member.
Figure 11B:
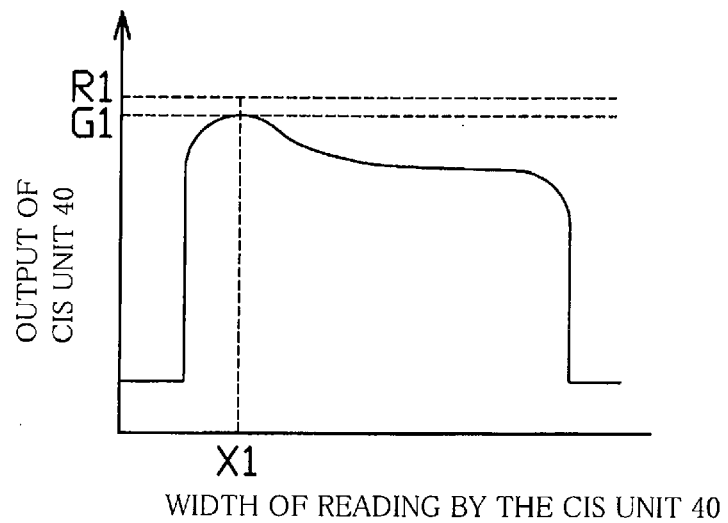
Figure 11C:
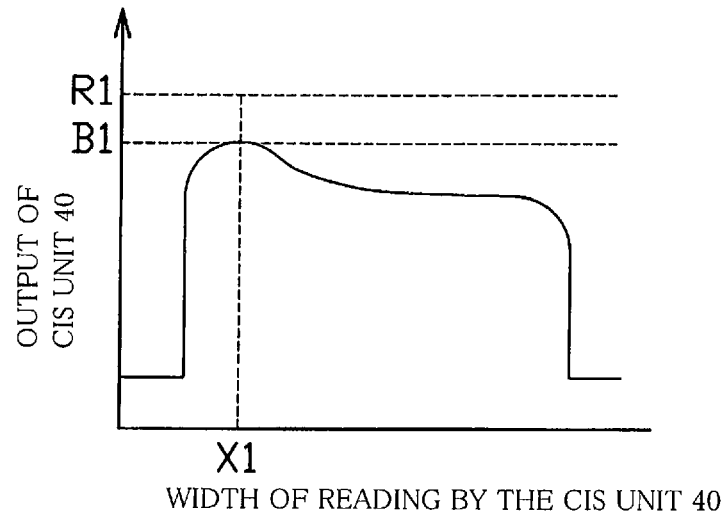

In each of FIGS. 11A-11C, the abscissa represents the row of the light receiving elements 44 arranged in a width of reading by the CIS unit 40. Each light receiving element 44 corresponds to one pixel in the main scanning direction of the CIS unit 40. It can be expressed that three pieces of data obtained for the respective colors RGB from a same light receiving element of a particular pixel correspond to one another. The ordinate represents the outputs of the respective light receiving elements 44 that correspond to the data of a quantity obtained as the white level information by reading the white area 53A at the respective pixels. The quantity to be obtained as the white level information may be, for instance, the output voltage of the light receiving elements 44, but is not limited thereto.

Where the three pieces of data of the quantity obtained by a light receiving element 44 for the respective colors RGB at a particular pixel X1 in a direction of a width of reading by the CIS unit 40 (hereinafter referred to as "reading width direction") are represented by R1, G1, B1, as shown in FIGS. 11A-11C, a ratio R1:G1:B1=1:g1:b1 is stored in the RAM 58 with the ratio associated with the pixel X1. Such a ratio is calculated for each of the light receiving elements 44 arranged in a row in the reading width direction, that is, for each pixel, and the calculated ratios are stored in the RAM 58 with the ratios associated with the respective pixels.

Although the ratio is calculated for each of the light receiving elements 44 in this embodiment, this is not essential. That is, the ratio may be calculated for each of subgroups of the light receiving elements 44, each of which subgroups consists of a predetermined number of the light receiving elements 44 obtaining a group of data and integrally mounted on a single chip. In the former case where the ratio is calculated for each light receiving element or each pixel, the calculation is highly precise, making precise a correction of the white level information as described later. On the other hand, in the latter case where the ratioradio is calculated for each of the subgroups of the light receiving elements 44, or each of pixel groups each of which consists of a plurality of pixels, the number of ratios that should be calculated and stored in the RAM 58 is made small, thereby reducing the load on the RAM 58.

Figure 12A:
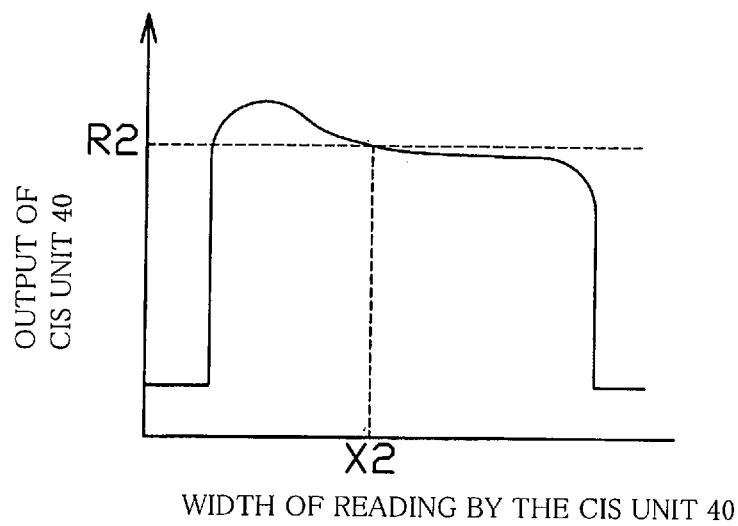
FIGS. 12A, 12B, and 12C are graphs of the quantity obtained as white level information, for red (R), green (G), and blue (B), respectively, in a case where a foreign material, flaw, or the like, which results in an abnormality in one of the sets of data obtained with respect to blue (B), is on the reference member within a white area thereof.
Figure 12B:
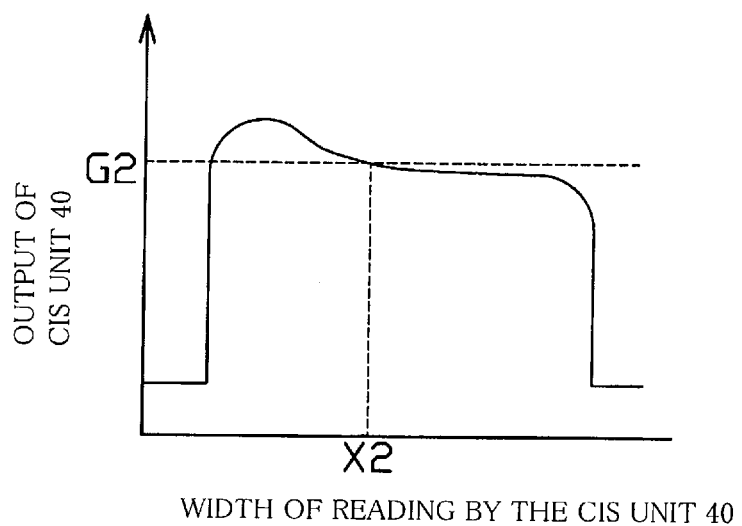
Figure 12C:
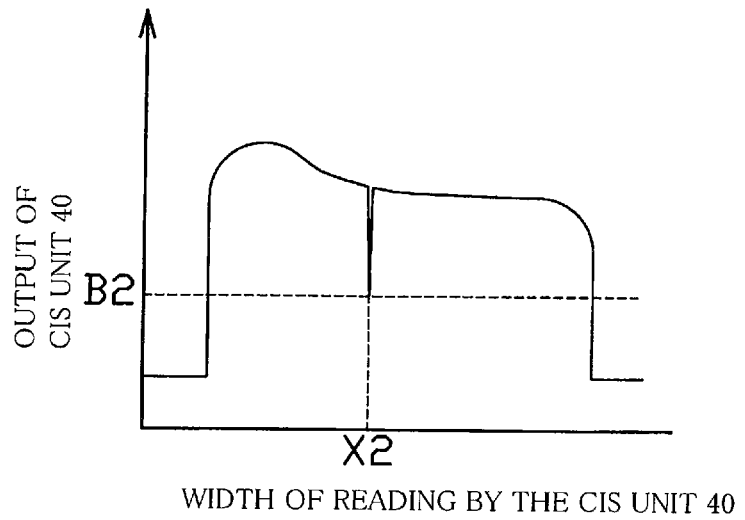

Then, the control flow goes to step S22 in which the control unit 55 calculates a difference between two values or data at each two adjacent pixels in each set of data obtained as the white level information for each of the colors. Where the white area 53A of the reference member 53 is free from a foreign particle, flaw or the like, the level of the quantity as the white level information obtained for each of the colors gently varies along the reading width direction, within a predetermined range, as shown in FIGS. 11A-11C. This gentle variation results from variation in distribution of the light as emitted from the light sources 42, and in the photosensitivity among the light receiving elements 44, or for other reasons. On the other hand, where a foreign particle or the like is on the white area 53A of the reference member 53, the output of, or the quantity obtained by, the light receiving element corresponding to the pixel where the foreign particle or the like is present on the reference member 53 abruptly varies, namely, drops, as shown in FIG. 12C.

Hence, a difference between each two outputs of, or two values of data obtained by, two adjacent light receiving elements 44 is calculated for each color, and when any of the differences calculated for the white level information of a color is relatively large, it can be determined that the output of the light receiving elements 44 for the color locally abruptly varies. The abruptly varying point in the white level information can be considered to indicate an abnormality due to a foreign particle, flaw, or the like on the white area 53A of the reference member 53. Thus, in step S23 the control unit 55 determines for each color whether any of the differences between two values of data obtained by each two adjacent light receiving elements 44 is not smaller than a predetermined threshold, to determine whether each of the data obtained with respect to any color by the row of the light receiving elements 44 which extends in the reading width direction is abnormal. The predetermined threshold value is determined by taking account of various factors including the variation in distribution of the light emitted from the light sources 42 and in the photosensitivity of the light receiving elements 44, and preset in the EEPROM 59.

Although in this specific example the difference between the data from each two adjacent light receiving elements is compared with the threshold, this is not essential. That is, the threshold may be compared with a difference between data from light receiving elements that are not two adjacent light receiving elements, but are in a predetermined relationship with each other.

When it is determined in step S23 that the white level information for all the colors RGB does not include abnormal data, the control unit 55 terminates the abnormality determination routine. In this case, the white level information obtained with respect to the white area 53A in the reference member 53 is not corrected of any of the RGB colors, but is stored in the RAM 58 as-is, so that the shading correction will be implemented using the reference data based on the white level information of the respective colors R, G, B.

On the other hand, when the control unit 55 determines in step S23 that the white level information of some of the RGB colors includes abnormal data, the control flow goes to step S24 in which the control unit 55 determines of which color the white level information determined to include the abnormal data is. When the white level information of only one color is determined to include abnormal data, as in the case of FIGS. 12A-12C where the white level information of blue (B) shown in FIG. 12C includes abnormal data, but that of the other colors, i.e., red (R), green (G), does not, the control flow goes to step S25 to correct the white level information of blue, (B) based on the white level information of red (R) and green (G) that are respectively shown in FIGS. 12A and 12B.

Such a case where the white level information of only one color is determined to include abnormal data may occur, for instance, when the white level information of the respective colors RGB is obtained while the CIS unit 40 is moved relatively to the white area 53A of the reference member 53, and a foreign particle, flaw, or the like is present on the reference member 53 at a place in the white area 53A wherefrom the abnormal data is obtained of the white level information of blue (B). The case may also occur when a foreign particle or the like adhering to the reference member 53 in the white area 53A is yellow in color, and thus the foreign particle affects only the white level information of blue (B) that is complementary to yellow. By thus determining an abnormality in the white level information from the differences between two values of data obtained by two adjacent light receiving elements 44, an abnormality can be determined irrespective of the absolute values of the white level information.

The correction of the white level information will be described in detail. The control unit 55 initially identifies the light receiving element 44 that obtains the abnormal data. In this specific case, the light receiving element 44 obtaining the abnormal data is at a pixel X2 in the reading width direction, at which X2 the level of the quantity abruptly drops, as shown in FIG. 12C, and the data obtained for the respective colors RGB at the pixel X2 are represented by R2, G2, and B2. Among the data R2, G2, and B2, data B2 is the abnormal data where the level of the quantity as the white level information abruptly drops. Hence, a ratio among the colors RGB at a pixel or a pixel unit, which is the closer one to the pixel X2, of the pixels or pixel units not including abnormal data, is read from the RAM 58. This ratio is represented by 1:g2:b2. Then, a value of the data R2 at the pixel X2 in the white level information for red (R), as shown in FIG. 12A, is multiplied by the ratio b2, to obtain correction data E1. Further, a value of the data G2 at the pixel X2 in the white level information for green (G), as shown in FIG. 12B, is multiplied by the ratio b2/g2, to obtain correction data E2. An average of the correction data E1, E2 is obtained, and stored in the RAM 58 as average correction data Ea.

Subsequently, the control flow goes to step S27 in which the control unit 55 replaces the abnormal data B2 at the pixel X2 in the white level information for blue (B) shown in FIG. 12C, with the average correction data Ea, thereby correcting the abruptly varying part of the white level information, based on the white level information of red (R) and green (G) that is not determined to include abnormal data. The average correction data Ea is obtained by multiplying values of the data at the pixel X2 in the white level information of the respective other colors not determined to include abnormal data, by the ratio among the white level information of the respective colors RGB, to take into account of the variation in the chromatic aberration of the lenses 43 and the photosensitivity of the light receiving elements 44 among the colors RGB. In this way, the abnormal part in the white level information of blue (B) is made equal to the other part thereof by the correction according to the white-level-information obtaining routine and the abnormality determination routine, thereby obtaining white level information of blue (B) similar to one shown in FIG. 11C which does not include abnormal data. The white level information of blue (B) having been corrected, and the white level information of the other colors R, G are stored in the RAM 58, so that the shading correction will be implemented using the reference data based on the white level information of the respective colors R, G, B.

Figure 13A:
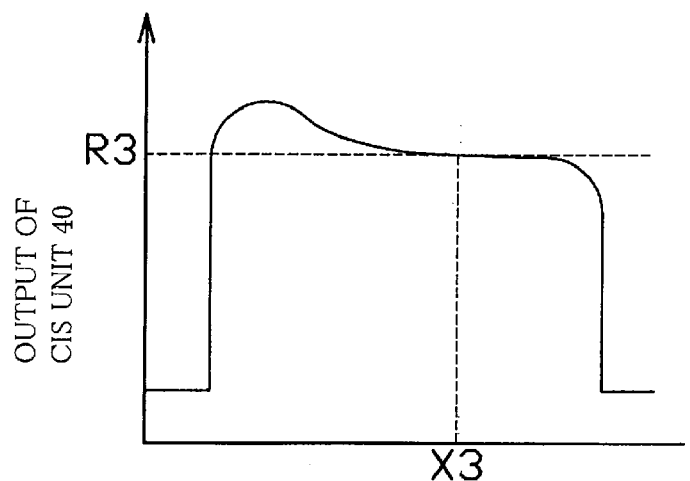
FIGS. 13A, 13B, and 13C are graphs of the quantity obtained as white level information, for red (R), green (G), and blue (B), respectively, in a case where a foreign material, flaw, or the like, which results in an abnormality in two of the sets of data obtained with respect to blue (B) and green (G), is on the reference member within a white area thereof.
Figure 13B:
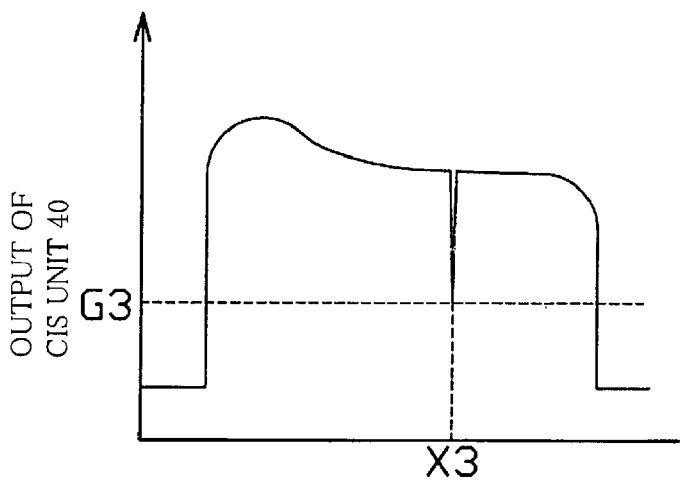
Figure 13C:
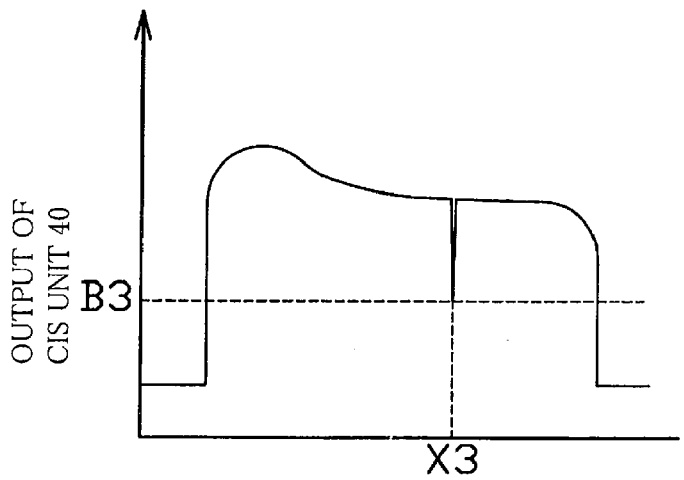

On the other hand, when it is determined in step S24 that the white level information of two of the three colors RGB is determined to include abnormal data, the abnormal data are corrected based on the white level information of the other color. FIGS. 13A-13C shows such a case, where the white level information of G and B shown in FIGS. 13B and 13C includes abnormal data, and the abnormal data are corrected based on the white level information of red (R) shown in FIG. 13A.

More specifically, when it is determined in step S24 that the white level information of green (G) and blue (B) (shown in FIGS. 13B and 13C) is determined to include abnormal data, the control flow goes to step S26 in which the control unit 55 first identifies the light receiving element 44 that obtains the abnormal data. As shown in FIGS. 13B and 13C, the light receiving element 44 obtaining the abnormal data is at a pixel X3 in the reading width direction, at which X3 the level of the quantity abruptly drops, as shown in FIGS. 13B and 13C, and the values of data obtained for the respective colors RGB at the pixel X3 are represented by R3, G3, and B3. Among the data R3, G3, and B3, the data G3 and B3 are the abnormal data where the level of the quantity as the white level information abruptly drops. Hence, a ratio among the colors RGB at a pixel or a pixel unit, which is the closer one, to the pixel X3, of the pixels or pixel units not including abnormal data, is read from the RAM 58. This ratio is represented by 1:g3:b3. Then, a value of the data R3 at the pixel X3 in the white level information for red (R), as shown in FIG. 13A, is multiplied by the ratio g3, to obtain correction data E3. Similarly, a value of the data R3 is multiplied by the ratio b3, to obtain correction data E4. The correction data E3, E4 are stored in the RAM 58 as correction data for G and B, respectively.

Subsequently, the control flow goes to step S27 in which the control unit 55 replaces the abnormal data G3 at the pixel X3 in the white level information of G shown in FIG. 13B, with the correction data E3, and similarly replaces the abnormal data B3 at the pixel X3 in the white level information of B shown in FIG. 13C, with the correction data E4. Thus, the abruptly varying part of the white level information is corrected based on the white level information of R that is not determined to include abnormal data. The correction data E3, E4 are obtained by multiplying data at the pixel X3 in the white level information of R not determined to include abnormal data, by the ratios of the white level information of G and B to that of R, respectively, to take into account of the variation among the colors RGB in the chromatic aberration of the lenses 43 and the photosensitivity of the light receiving elements 44. In this way, the abnormal part in the white level information of each of G and B is made equal to the other part thereof by the correction according to the white-level-information obtaining routine and the abnormality determination routine, thereby obtaining white level information of G and B similar to ones shown in FIGS. 11B and 11C which does not include abnormal data. The white level information of G and B having been corrected, and the white level information of R, are stored in the RAM 58, so that the shading correction will be implemented using the reference data based on the white level information of the respective colors R, G, B.

Although not shown in the drawings, when it is determined in step S24 that the white level information of all the colors RGB includes abnormal data at the same pixel in the reading width direction, it is impossible to correct the white level information. Hence, the control flow goes to step S28 in which the control unit 55 makes a decision that this time correction of the white level information is impossible and outputs a signal indicative of "error".

Referring back to the flowchart of FIG. 8, when the white level information not including the abnormality has been obtained for all the colors RGB in step S2, the control flow goes to step S3 in which the control unit 55 operates the carriage motor 64 to move the carriage 41 to a position P1 corresponding to a black middle area 53B in the reference member 53, the light receiving elements 44 receive the light of RGB from the black area 53B while the light sources 42 are off and not emitting light, and output corresponding electrical signals as the black level information. Similarly to the specific ways of obtaining the white level information described above, the black level information may be obtained by reading the black area 53B a plurality of times, or alternatively by reading a plurality of places in the black area 53B by the row of the light receiving elements 44 for the respective colors, while the carriage 41 is moved within a range of the black area 53B. Further, the order in which the white level information and the black level information are obtained may be inverse. The control flow then goes to step S4 to process the thus obtained white level information and black level information into shading data to be used in the shading correction of an image read, and the obtained shading data is stored in the RAM 58.

The control flow then goes to step S5 in which the control unit 55 operates to read an image on a document, fed along the ADF 5, or on the platen glass 20 when the scanner portion 2 is used as FBS. That is, the control unit 55 moves the carriage 41 to a predetermined reading position where the light sources 42 emit light of RGB and the light receiving elements 44 receive the reflected light of RGB from the document. The light receiving elements 44 convert the received light of RGB into electrical signals. Then, the control flow goes to step S6 in which the control unit 55 implements the shading correction for data sequentially outputted from the CIS unit 40. More specifically, the control unit 55 A/D converts an output signal from the CIS unit 40, and corrects the obtained digital signal based on the shading data stored in the RAM 58. The output data from the CIS unit 40 as having been subjected to the shading correction is stored in the RAM 58 as image data.

In this way, it is determined whether the white level information of the respective colors RGB is abnormal, or includes abnormal data, and the abnormal data is replaced with the correction data obtained by multiplying data of the white level information not determined to include abnormal data, by the ratio of the white level information among the colors RGB. Thus, where there is a foreign particle, stain, dust, or the like on the reference member 53 within the white area 53A, resulting in an abnormality in the white level information of some of the colors RGB obtained by reading the white area 53A, the abnormality is corrected easily and appropriately based on the white level information of the other color or colors that is not determined to include an abnormality.

Figure 14A:
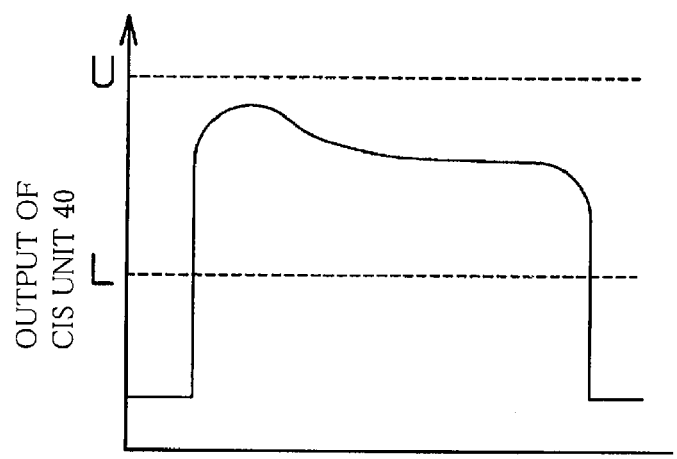
FIGS. 14A, 14B, and 14C are graphs of the quantity obtained as white level information, for red (R), green (G), and blue (B), respectively, in a case where a foreign material, flaw, or the like, which results in an abnormality in one of the sets of data, is on the reference member within a white area thereof.
Figure 14B:
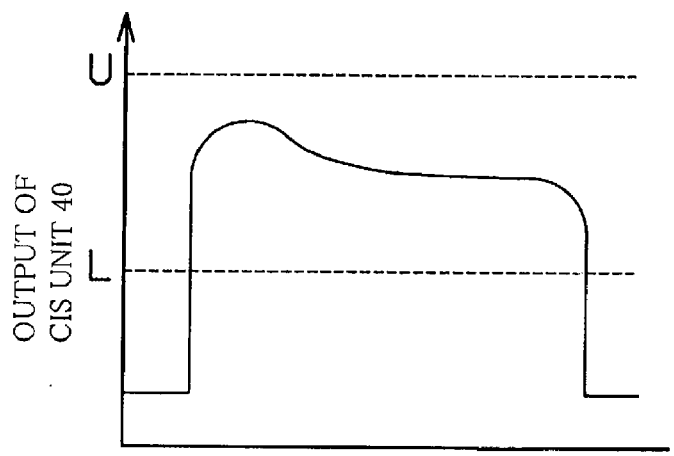
Figure 14C:
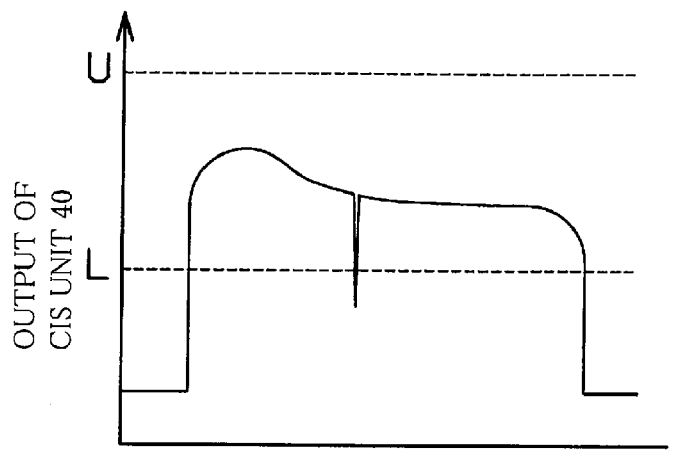

There will be now described a second embodiment of the invention, referring to FIGS. 14A-14C.

According to the first embodiment, in step S13 corresponding to the abnormality determination routine of FIG. 10, a difference between two values of data in the white level of each color as obtained by each two adjacent light receiving elements 44 is calculated, and when any of the differences with respect to the white level information of a color is not smaller than the threshold value, it is determined that the white level information of the color is abnormal, or includes abnormal data. According to the second embodiment, however, when any of the values of the data in the white level information of a color is outside a predetermined range, the data whose value is outside the range is determined to be abnormal. Other part of the second embodiment is identical with the first embodiment, and repetitive description thereof is omitted.

More specifically, the level of the quantity obtained, as the white level information of each of the colors RGB, by reading the white area 53A of the reference member 53, gently varies along the reading width direction, as shown in FIGS. 14A and 14B for instance, due to variation in distribution of the light emitted from the light sources 42 and in photosensitivity of the light receiving elements 44. However, when a foreign particle, stain, or the like is on the reference member 53 and within the white area 53A, the level of the quantity abruptly varies at a pixel corresponding to the place where the foreign particle or the like is present on the reference member 53, as shown in FIG. 14C. In view of this, a range, namely, an upper limit U and a lower limit L, is predetermined such that the data whose values are within the range are to be determined to be normal, for each of the colors RGB, and when the level of the quantity, or the white level information, of a color includes an abruptly varying part, that is, when particular data of the white level of a color is outside the range, that particular data can be determined to be abnormal.

In each of the above-described embodiments, when the white level information which includes abnormal data is only that of one color (that is B in the case of FIGS. 12A-12C), and the white level information of the other two colors (that is R and G in the case of FIGS. 12A-12C) does not include abnormal data, the abnormal data is replaced with average correction data Ea that is a mean value of the correction data E1, E2 obtained by multiplying respective values of data of the white level information not including abnormal data (that is the white level information of R and G in the case of FIGS. 12A-12C), by the ratio. However, the abnormal data (that is B2 in the case of FIGS. 12A-12C) may be replaced with correction data (that is E1 in the case of FIGS. 12A-12C) that is obtained by multiplying, by the ratio, the closer one (that is R2 in the case of FIGS. 12A-12C) to data representing white color, of the two values of data (that are R2 and G2 in the case of FIGS. 12A-12C) at the same pixel as the abnormal data (B2) in the white level information of the respective other colors (R and G). The closer one of the two values can be said to be the higher one of the two values.

In each of the above-described embodiments, the CIS unit 40 that is a close-contact type image sensor is used as the image reading device. However, according to the invention, the image reading device may be of other types than close-contact type. For instance, a CCD image sensor of a miniaturized optical system may be used. In the case where a CCD image sensor is employed, the output of the CCD image sensor may take a negative value, or appear on the negative side that is opposite to the side, for instance as shown in FIGS. 11A-11C illustrating the case with the close-contact type image sensor 40, such that an absolute value of the negative value obtained as a result of reading by the CCD image sensor increases with increase in the sensed light amount. In this case, the range serving as a criterion used in the determination of abnormal data, and the value representing white color, are determined in view of the output taking negative values.

What is claimed is:

1. An image reading apparatus for reading an image with respect to a plurality of colors, comprising:
 a reference member;
 an image reading device including a plurality of light receiving elements, the image reading device reading the reference member to obtain white level information for the respective colors, the white level information for each of the colors being a set of data of a quantity obtained by the light receiving elements, the read image being corrected based on at least the white level information;
 a ratio calculator which calculates a ratio among the white level information of the respective colors;
 an abnormal-data determiner which determines that a first specific piece of data in the white level information of any particular color is abnormal data, at least one of the following two cases: (i) where the first specific piece of data in the white level information is different from a second specific piece of data in the white level information of the same color which second specific piece of data is in a predetermined relationship with the first specific data, by an amount not smaller than a predetermined threshold; and (ii) where the first specific data is outside a predetermined range; and
 a data corrector which obtains correction data which is obtained by multiplying, by the ratio, corresponding data which corresponds to the abnormal data according to a predefined principle and included in the white level information of at least one color which is determined not to include the abnormal data, and which replaces the abnormal data with the correction data.

2. The apparatus according to claim 1, wherein the ratio calculator calculates the ratio data by data.

3. The apparatus according to claim 1, wherein the ratio calculator calculates the ratio for each data group which consists of the data obtained by a predetermined number of the light receiving elements.

4. The apparatus according to claim 2, wherein the correction data is obtained by multiplying the corresponding data in the white level information of the at least one color, by the ratio calculated based on data from one of the light receiving elements which is adjacent to the light receiving element corresponding to the abnormal data.

5. The apparatus according to claim 3, wherein the predetermined number of the light receiving elements constitute a subgroup of the light receiving elements, and wherein the correction data is obtained by multiplying the corresponding data in the white level information of the at least one color, by the ratio calculated based on data from one of the subgroups which one is adjacent to the light receiving element corresponding to the abnormal data.

6. The apparatus according to claim 1, wherein when the white level information of two or more colors is not determined to include the abnormal data, the correction data is average correction data obtained by averaging a plurality of data each obtained by multiplying the corresponding data in each of the white level information of the two or more colors not determined to include the abnormal data, by the ratio.

7. The apparatus according to claim 4, wherein when the white level information of two or more colors is not determined to include the abnormal data, the correction data is average correction data obtained by averaging a plurality of data each obtained by multiplying the corresponding data in each of the white level information of the two or more colors not determined to include the abnormal data, by the ratio.

8. The apparatus according to claim 5, wherein when the white level information of two or more colors is not determined to include the abnormal data, the correction data is average correction data obtained by averaging a plurality of data each obtained by multiplying the corresponding data in each of the white level information of the two or more colors not determined to include the abnormal data, by the ratio.

9. The apparatus according to claim 1, wherein when the white level information of two or more colors is not determined to include the abnormal data, the correction data is obtained by multiplying, by the ratio, a nearest one of the corresponding data in the white level information of the respective colors not determined to include the abnormal data, to data representing white color.

10. The apparatus according to claim 4, wherein when the white level information of two or more colors is not determined to include the abnormal data, the correction data is obtained by multiplying, by the ratio, a nearest one of the corresponding data in the white level information of the respective colors not determined to include the abnormal data, to data representing white color.

11. The apparatus according to claim 5, wherein when the white level information of two or more colors is not determined to include the abnormal data, the correction data is obtained by multiplying, by the ratio, a nearest one of the corresponding data in the white level information of the respective colors not determined to include the abnormal data, to data representing white color.

12. The apparatus according to claim 1, wherein the image reading device obtains the white level information while moving relative to the reference member.

\* \* \* \* \*